United States Patent
Luo et al.

(10) Patent No.: US 9,319,183 B2
(45) Date of Patent: Apr. 19, 2016

(54) HYBRID AUTOMATIC REPEAT REQUEST OPERATION AND DECODING STATUS SIGNALING FOR UPLINK MULTIPLE-INPUT MULTIPLE-OUTPUT

(75) Inventors: Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 12/840,131

(22) Filed: Jul. 20, 2010

(65) Prior Publication Data
US 2011/0026622 A1 Feb. 3, 2011

Related U.S. Application Data

(60) Provisional application No. 61/230,084, filed on Jul. 30, 2009.

(51) Int. Cl.
*H04L 27/06* (2006.01)
*H04L 1/16* (2006.01)
*H04L 1/18* (2006.01)

(52) U.S. Cl.
CPC ............ *H04L 1/1614* (2013.01); *H04L 1/1812* (2013.01); *H04L 1/1829* (2013.01); *H04L 1/1867* (2013.01)

(58) Field of Classification Search
CPC ... H04L 1/1614; H04L 1/1812; H04L 1/1829; H04L 1/1867
USPC .......................................... 370/249, 310–350
See application file for complete search history.

(56) References Cited

U.S. PATENT DOCUMENTS

| | | | |
|---|---|---|---|
| 6,700,867 B2* | 3/2004 | Classon et al. | 370/216 |
| 2009/0028263 A1* | 1/2009 | Yu et al. | 375/267 |
| 2010/0031110 A1* | 2/2010 | Seok et al. | 714/748 |
| 2010/0031117 A1* | 2/2010 | Lee et al. | 714/752 |

(Continued)

FOREIGN PATENT DOCUMENTS

| | | |
|---|---|---|
| CN | 101147352 A | 3/2008 |
| EP | 1855408 | 11/2007 |

(Continued)

OTHER PUBLICATIONS

3GPP Draft: R1-082707, Entitled: Uplink SU-MIMO for E-UTRA, By: Texas Instruments, Dated: Jun. 30-Jul. 4, 2007.*

(Continued)

*Primary Examiner* — Ricky Ngo
*Assistant Examiner* — Wei-Po Kao
(74) *Attorney, Agent, or Firm* — Larry J. Moskowitz

(57) ABSTRACT

Systems and methodologies are described that facilitate conveying decoding statuses in a wireless communication environment. A UE can transmit a plurality of codewords as part of an uplink multiple-input multiple-output (MIMO) transmission to a base station. The base station can receive and attempt to decode the plurality of codewords. Further, decoding statuses for the plurality of codewords can be determined. Moreover, the decoding statuses for the plurality of codewords can be signaled to the UE. For example, the decoding statuses for the plurality of codewords can be conveyed via a single PHICH. According to another example, multiple PHICHs can convey the decoding statuses. Pursuant to a further example, the decoding statuses can be conveyed at least in part via a PDCCH.

48 Claims, 13 Drawing Sheets

(56) References Cited

U.S. PATENT DOCUMENTS

| | | | |
|---|---|---|---|
| 2011/0176502 A1* | 7/2011 | Chung et al. | 370/329 |
| 2012/0020299 A1* | 1/2012 | Chun et al. | 370/328 |

FOREIGN PATENT DOCUMENTS

| | | | |
|---|---|---|---|
| JP | 2011517515 A | | 6/2011 |
| JP | 2011529290 A | | 12/2011 |
| TW | 200832997 A | | 8/2008 |
| WO | WO2007145492 | | 12/2007 |
| WO | 2008085000 A1 | | 7/2008 |
| WO | 2009113836 A1 | | 9/2009 |
| WO | 2010011083 A2 | | 1/2010 |

OTHER PUBLICATIONS

U.S. Appl. No. 61/082,827.*
U.S. Appl. No. 61/157,525.*
U.S. Appl. No. 61/156,533.*
U.S. Appl. No. 61/158,400.*
International Search Report and Written Opinion—PCT/US2010/043845, International Search Authority—European Patent Office—Nov. 5, 2010.
LG Electronics: "DL ACK/NACK mapping 1-48 relations" 3GPP Draft; RI-072882 DL ACKNACK, 3rd Generation Partnership Project (3GPP), Mobile Competence Centre ; 650, Route Des Lucioles ; F-06921 Sophia-Antipolis Cedex ; France, vol. RAN WG1, no. Orlando, USA; Jun. 20, 2007, XP050106561.
Samsung: "HARQ handling in UL MIMO" 1-48 3GPP Draft; RI-102209 ULHARQ, 3rd Generation Partnership Project (3GPP), Mobile Competence Centre ; 650, Route Des Lucioles ; F-06921 Sophia-Antipolis Cedex ; France, vol. RAN WG1, no. Beijing, china; Apr. 12, 2010, Apr. 6, 2010, XP050419481.
Texas Instruments: "Layer Mapping 1-48 Solution for Uplink SU-MIMO" 3GPP Draft; RI-090589 TI UL MIMO Layer, 3rd Generation Partnership Project (3GPP), Mobile Competence Centre ; 650, Route Des Lucioles ; F-06921 Sophia-Antipolis Cedex ; France, no. Athens, Greece; Feb. 3, 2009, XP050318478.
Texas Instruments: "Uplink SU-MIMO for E-UTRA" 3GPP Draft; R1-082707 TI ULSUMIMO REV, 3rd Generation Partnership Project (3GPP), Mobile Competence Centre ; 650, Route Des Lucioles ; F-06921 Sophia-Antipolis Cedex ; France vol. RAN WG1, no. Warsaw, Poland; Jul. 3, 2008, XP050110944.
Huawei: "Uplink Spatial Multiplexing for LTE-A", 3GPP TSG-RAN WG1#56b, R1-091279, Seoul, Korea, Mar. 23-27, 2009.
NEC Group: "Views on LTE-A UL MIMO issues", 3GPP TSG-RAN WG1#56b, R1-091224, Seoul, Korea, Mar. 23-27, 2009.
Panasonic: "Single codeword indication on DCI format 2", 3GPP TSG-RAN WG1#53b, R1-082400, Warsaw, Poland, pp. 1-4, Jun. 30-Jul. 4, 2008.
Taiwan Search Report—TW099125491—TIPO May 17, 2013.
Texas Instruments: "Layer Mapping Solution for Uplink SU-MIMO", 3GPP TSG-RAN WG1#56, R1-090589, Athens, Greece, pp. 1-4, Feb. 9-13, 2009.

* cited by examiner

HYBRID AUTOMATIC REPEAT REQUEST OPERATION AND DECODING STATUS SIGNALING FOR UPLINK MULTIPLE-INPUT MULTIPLE-OUTPUT

CROSS-REFERENCE TO RELATED APPLICATIONS

This application claims the benefit of U.S. Provisional Patent Application Ser. No. 61/230,084 entitled "HYBRID AUTOMATIC REPEAT REQUEST OPERATION AND DECODING STATUS SIGNALING" which was filed Jul. 30, 2009. The entirety of the aforementioned application is herein incorporated by reference.

BACKGROUND

I. Field

The following description relates generally to wireless communications, and more particularly to signaling decoding statuses in a wireless communication system that employs uplink multiple-input multiple-output (MIMO).

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

Conventionally, a UE can transmit a single codeword to a base station over the uplink (e.g., at a given time, . . . ). For instance, the base station can receive and attempt to decode the single codeword. If the single codeword is successfully decoded, then the base station can signal an acknowledgment (ACK) to the UE. Alternatively, if the single codeword fails to be successfully decoded, then the base station can signal a negative acknowledgment (NAK) to the UE. For example, a one bit indicator can specify a decoding status (e.g., an ACK or a NAK, . . . ) to the UE for the single codeword (e.g., "1" can indicate an ACK and "0" can indicate a NAK, "0" can indicate an ACK and "1" can indicate a NAK, . . . ). The one bit indicator can be a Hybrid Automatic Repeat Request (HARQ) indicator. Further, the indicator can be carried on a Physical HARQ Indicator Channel (PHICH).

Typically, a one bit indicator can be carried on a PHICH to identify a decoding status of a single codeword corresponding to a single transport block sent on an uplink data channel (e.g., Physical Uplink Shared Channel (PUSCH), . . . ). However, conventional use of a one bit indicator carried on a PHICH can cause ambiguity when more than one codeword is sent on an uplink data channel (e.g., PUSCH, . . . ) by the UE to the base station. For instance, multiple codeword transmissions in the uplink can be supported to extend uplink peak rates by implementing uplink MIMO. Yet, attempting to signify more than one decoding status corresponding to more than one codeword to the UE via a one bit indicator carried on a PHICH can cause ambiguity (e.g., a NAK can be sent when one codeword fails to be successfully decoded or when more than one codeword fails to be successfully decoded, . . . ). Accordingly, the UE may be unable to unambiguously recognize whether the multiple codewords are successfully decoded, unsuccessfully decoded, or a subset of the multiple codewords are successfully decoded with a remainder of the multiple codewords being unsuccessfully decoded. For instance, the foregoing can lead to unnecessary retransmission of codeword(s) that are successfully decoded by the base station, which can cause inefficiency in the wireless communication environment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating conveying of decoding statuses in a wireless communication environment. A UE can transmit a plurality of codewords as part of an uplink multiple-input multiple-output (MIMO) transmission to a base station. The base station can receive and attempt to decode the plurality of codewords. Further, decoding statuses for the plurality of codewords can be determined. Moreover, the decoding statuses for the plurality of codewords can be sent to the UE. For example, the decoding statuses for the plurality of codewords can be conveyed via a single PHICH. According to another example, multiple PHICHs can convey the decoding statuses. Pursuant to a further example, the decoding statuses can be conveyed at least in part via a PDCCH.

According to related aspects, a method that facilitates conveying decoding statuses in a wireless communication environment is described herein. The method can include receiving a plurality of codewords of a multiple codeword uplink transmission from a user equipment (UE). Further, the method can include attempting to decode the plurality of codewords. Moreover, the method can include determining decoding statuses for the plurality of codewords. The method can also include signaling the decoding statuses for the plurality of codewords to the UE.

Another aspect relates to an apparatus for wireless communication. The apparatus may include a receiving module for receiving a plurality of codewords of a multiple codeword uplink transmission from a user equipment (UE). Further, the apparatus may include a decoding module for determining decoding statuses for the plurality of codewords. Moreover, the apparatus may include a transmitting module for sending the decoding statuses for the plurality of codewords to the UE.

Yet another aspect relates to an apparatus that enables conveying decoding statuses in a wireless communication environment. The apparatus can include means for receiving a plurality of codewords of a multiple codeword uplink transmission from a user equipment (UE). Further, the apparatus can include means for determining decoding statuses for the plurality of codewords. Moreover, the apparatus can include means for sending the decoding statuses for the plurality of codewords to the UE.

Still another aspect relates to a computer program product that can comprise a computer-readable medium. The computer-readable medium can include code for receiving a plurality of codewords of a multiple codeword uplink transmission from a user equipment (UE). Further, the computer-readable medium can include code for determining decoding statuses for the plurality of codewords. Moreover, the computer-readable medium can include code for signaling the decoding statuses for the plurality of codewords to the UE.

In accordance with another aspect, an apparatus can include a processor, wherein the processor can be configured to receive a plurality of codewords of a multiple codeword uplink transmission from a user equipment (UE). Moreover, the processor can be configured to attempt to decode the plurality of codewords. Further, the processor can be configured to determine decoding statuses for the plurality of codewords based on the attempt. The processor can also be configured to send the decoding statuses for the plurality of codewords to the UE.

According to other aspects, a method that facilitates obtaining decoding statuses in a wireless communication environment is described herein. The method can include sending a plurality of codewords as part of an uplink multiple-input multiple-output (MIMO) transmission to a base station. Further, the method can include detecting decoding statuses for the plurality of codewords conveyed from the base station.

Another aspect relates to an apparatus for wireless communication. The apparatus may include a transmitting module for sending a plurality of codewords as part of an uplink multiple-input multiple-output (MIMO) transmission to a base station. Additionally, the apparatus may include a receiving module for receiving decoding statuses conveyed from the base station. Further, the apparatus may include a detecting module for detecting the decoding statuses for the plurality of codewords.

Yet another aspect relates to an apparatus that enables obtaining decoding statuses in a wireless communication environment. The apparatus can include means for sending a plurality of codewords as part of an uplink multiple-input multiple-output (MIMO) transmission to a base station. Moreover, the apparatus can include means for detecting decoding statuses for the plurality of codewords conveyed from the base station.

Still another aspect relates to a computer program product that can comprise a computer-readable medium. The computer-readable medium can include code for sending a plurality of codewords as part of an uplink multiple-input multiple-output (MIMO) transmission to a base station. Further, the computer-readable medium can include code for detecting decoding statuses for the plurality of codewords conveyed from the base station.

In accordance with another aspect, a wireless communications apparatus can include a processor, wherein the processor can be configured to send a plurality of codewords as part of an uplink multiple-input multiple-output (MIMO) transmission to a base station. Moreover, the processor can be configured to detect decoding statuses for the plurality of codewords conveyed from the base station.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
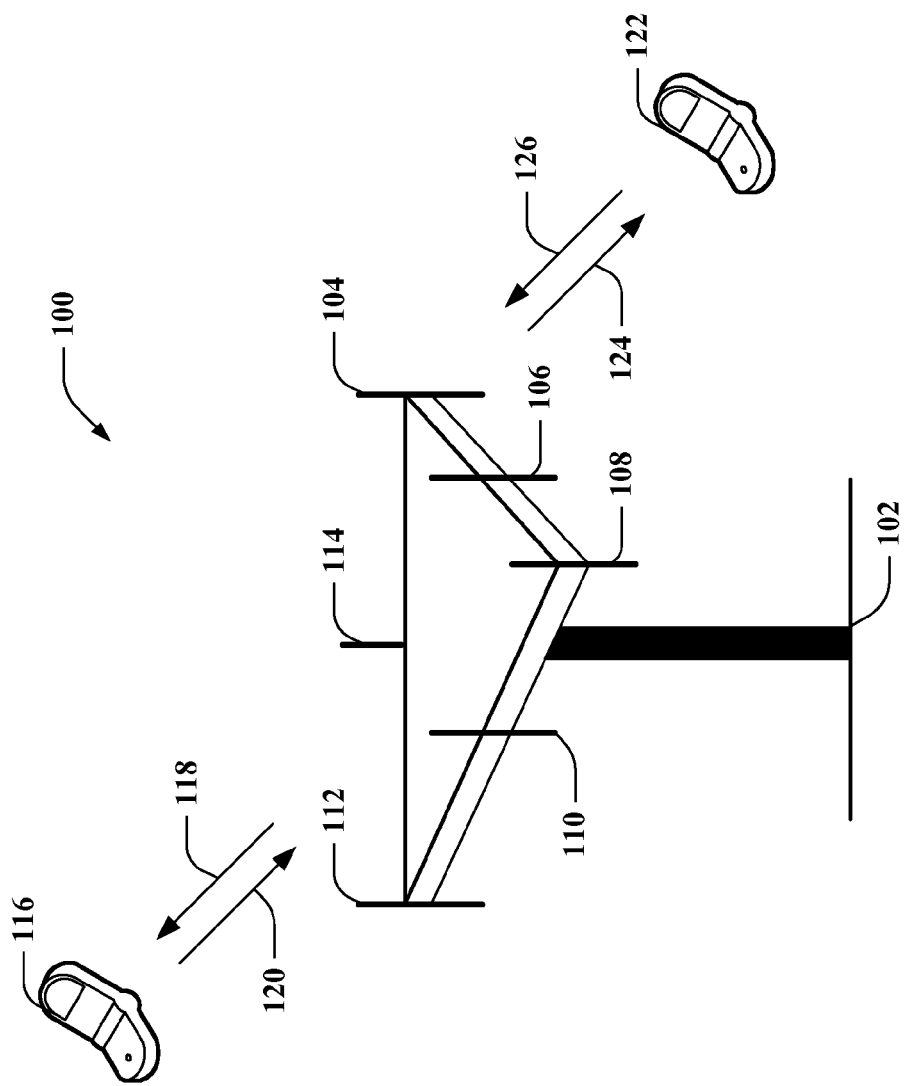
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules etc. discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

System 100 can support uplink multiple-input multiple-output (MIMO) operation. Thus, a given UE (e.g., UE 116, UE 122, . . . ) can transmit multiple codewords to base station 102 in a particular subframe. The multiple codewords can be carried on an uplink data channel such as a Physical Uplink Shared Channel (PUSCH). Use of multiple codeword transmission on the uplink can extend uplink peak rates, for example.

Moreover, base station 102 can receive the multiple codewords from the given UE and can attempt to decode the multiple codewords. Based thereupon, base station 102 can identify decoding statuses for the multiple codewords. For example, a decoding status for a codeword can be whether the codeword is successfully decoded or unsuccessfully decoded. Moreover, base station 102 can signal the decoding statuses for the multiple codewords to the given UE. By way of example, base station 102 can signal the decoding statuses for the multiple codewords by sending multiple indicators respectively carried by multiple Physical Hybrid Automatic Repeat Request (HARD) Indicator Channels (PHICHs). According to another example, base station 102 can signal the decoding statuses for the multiple codewords at least in part by sending a single indicator carried by a single PHICH. Following this example, base station 102 can further signal the decoding statuses for the multiple codewords at least in part based upon resource elements upon which the single PHICH is mapped. Additionally or alternatively, when leveraging the single PHICH, base station 102 can further signal the decoding statuses for the multiple codewords at least in part with information carried by a downlink control channel (e.g., a Physical Downlink Control Channel (PDCCH), . . . ).

Figure 2:
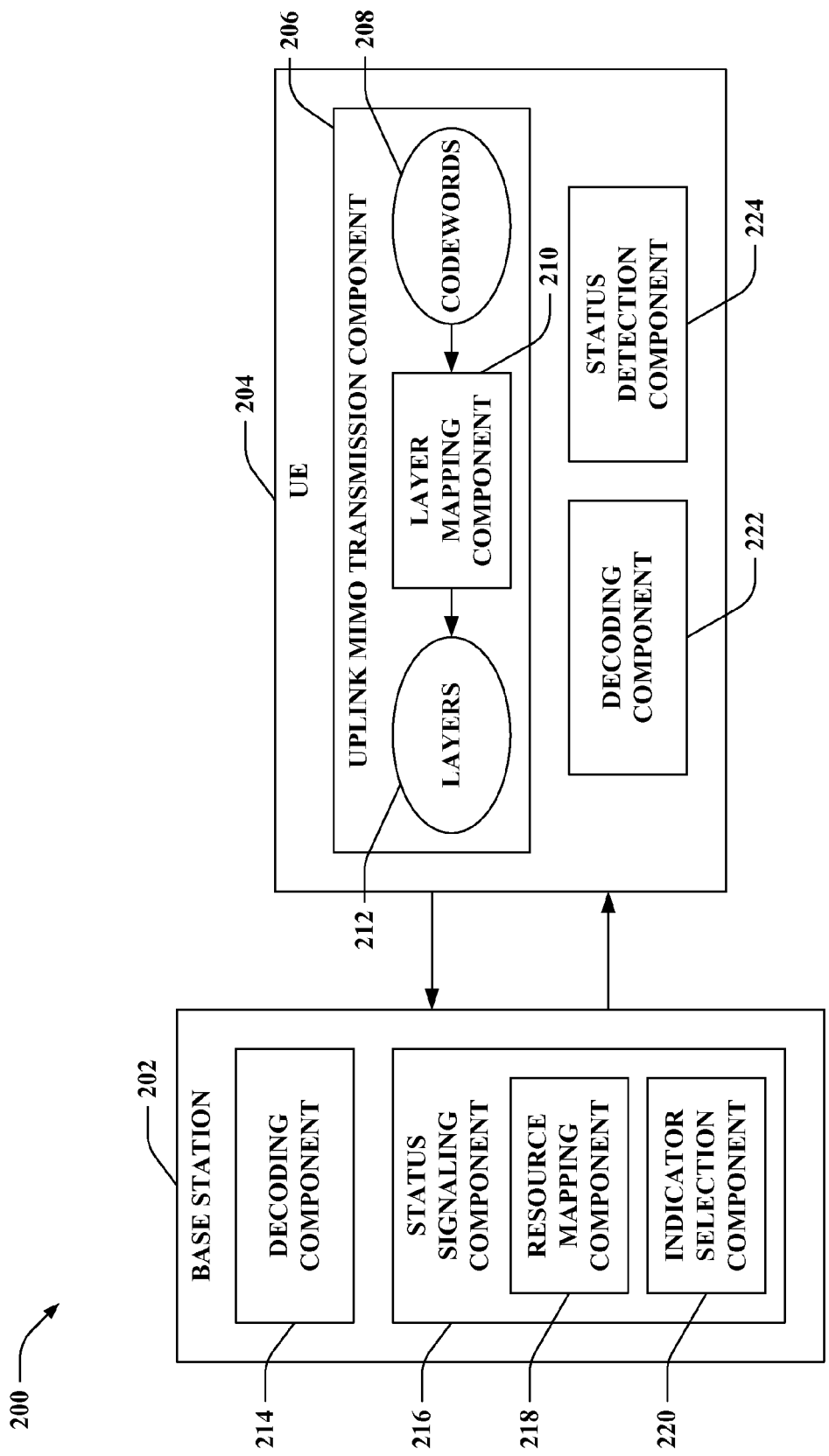
FIG. 2 is an illustration of an example system that signals decoding statuses in a wireless communication environment.

Now referring to FIG. 2, illustrated is a system 200 that signals decoding statuses in a wireless communication environment. System 200 includes a base station 202 that can transmit and/or receive information, signals, data, instructions, commands, bits, symbols, and the like. Base station 202 can communicate with a UE 204 via the forward link and/or reverse link. UE 204 can transmit and/or receive information, signals, data, instructions, commands, bits, symbols, and the like. Moreover, although not shown, it is contemplated that any number of base stations similar to base station 202 can be included in system 200 and/or any number of UEs similar to UE 204 can be included in system 200.

UE 204 can include an uplink MIMO transmission component 206 that can transmit codewords 208 of a multiple codeword uplink transmission (e.g., MIMO transmission, . . . ) over an uplink. A codeword (e.g., from codewords 208, . . . ) can be an independently encoded data block that corresponds to a single transport block, where the independently encoded data block can be protected by a cyclic redundancy check (CRC). Uplink MIMO transmission component 206 can transmit codewords 208 on a PUSCH. For example, a multiple codeword uplink transmission that includes two codewords (e.g., codewords 208, . . . ) can be sent by uplink MIMO transmission component 206 in a subframe; however, it is to be appreciated that the claimed subject matter is not so limited.

Moreover, uplink MIMO transmission component 206 can include a layer mapping component 210 that can map codewords 208 onto layers 212 for transmission. A layer can be a mapping of symbols onto transmit antenna ports of UE 204. A number of codewords 208 can be less than or equal to a number of layers 212, and the number of layers 212 can be less than or equal to a number of transmit antenna ports of UE 204. For example, layer mapping component 210 can map a particular codeword to one or more layers.

According to an example, two codewords (e.g., codeword 0 and codeword 1, codewords 208, . . . ) can be mapped by layer mapping component 210 to two layers (e.g., layer 0 and layer 1, layers 212, . . . ). By way of illustration, layer mapping component 210 can map codeword 0 to layer 0 and codeword 1 to layer 1; yet, the claimed subject matter is not so limited.

Moreover, layer mapping component 210 can implement layer shifting, for example. In accordance with an illustration, at a first time, layer mapping component 210 can map codeword 0 to layer 0 and codeword 1 to layer 1, while at a second time, layer mapping component 210 can map codeword 0 to layer 1 and codeword 1 to layer 0. Hence, layer mapping component 210 can cycle codeword 0 through layer 0 and layer 1, and similarly can cycle codeword 1 through layer 1 and layer 0. According to an alternatively example, layer mapping component 210 need not employ layer shifting. Thus, layer mapping component 210 can map codeword 0 to layer 0 and codeword 1 to layer 1 over time. It is to be appreciated, however, that the claimed subject matter is not limited to the foregoing.

Base station 202 can receive codewords 208 of the multiple codeword uplink transmission from UE 204. Base station 202 can include a decoding component 214 and a status signaling component 216. Decoding component 214 can attempt to decode codewords 208. Moreover, decoding component 214 can recognize respective decoding statuses for codewords 208. For instance, the decoding status for a particular codeword identified by decoding component 214 can be that the particular codeword is successfully decoded or unsuccessfully decoded. Referring again to the example of two codewords (e.g., codeword 0 and codeword 1, ...) sent by UE 204, decoding component 214 can detect a decoding status corresponding to codeword 0 and a decoding status corresponding to codeword 1. By way of further illustration, the respective decoding statuses for codewords 208 can be yielded by decoding component 214 based upon whether a corresponding CRC passes or fails (e.g., a decoding status for a codeword can be identified as being successfully decoded when a CRC for the codeword passes, a decoding status for a codeword can be identified as being unsuccessfully decoded when a CRC for the codeword fails, ...).

Moreover, status signaling component 216 can signal the decoding statuses for codewords 208 to UE 204. For example, status signaling component 216 can signal the decoding statuses for codewords 208 by sending multiple PHICHs over the air to UE 204. Thus, the multiple PHICHs can be used by status signaling component 216 to supply acknowledgement/negative acknowledgement (ACK/NAK) for multiple codewords (e.g., codewords 208, ...). According to another example, status signaling component 216 can signal the decoding statuses for codewords 208 by sending a single PHICH over the air to UE 204. Hence, the single PHICH can be used by status signaling component 216 to supply ACK/NAK for multiple codewords (e.g., codewords 208, ...).

Status signaling component 216 can further include a resource mapping component 218 and an indicator selection component 220. Resource mapping component 218 can select resource elements utilized to send a PHICH. Further, if multiple PHICHs are employed by status signaling component 216, then resource mapping component 218 can select resource elements utilized to send the multiple PHICHs. Moreover, indicator selection component 220 can set an indicator carried by the PHICH (or indicators carried by the multiple PHICHs). The indicator controlled by indicator selection component 220, for example, can be a HARQ ACK or NAK. By way of further example, the indicator can be one binary bit; however, it is to be appreciated that the claimed subject matter is not so limited.

The decoding statuses for codewords 208 can be signaled to UE 204 at least in part by the indicator (or plurality of indicators) set via indicator selection component 220. According to an example, the decoding statuses for codewords 208 can further be signaled to UE 204 at least in part by the resource elements selected by resource mapping component 218 for sending the PHICH. By way of another example, the decoding statuses for codewords 208 can further be signaled to UE 204 at least in part by information carried by a PDCCH transmitted by base station 202.

UE 204 can also include a decoding component 222 and a status detection component 224. Decoding component 222 can decode the PHICH or multiple PHICHs sent by base station 202. According to an example, decoding component 222 can also decode a PDCCH transmitted by base station 202. Based upon the decoding results yielded by decoding component 222, status detection component 224 can detect decoding statuses for codewords 208.

FIGS. 3-6 illustrate various example systems that convey decoding statuses 302 for multiple codewords to UE 204 in a wireless communication environment that employs uplink MIMO. For example, UE 204 can transmit multiple codewords of a multiple codeword uplink transmission to base station 202. Further, base station 202 can receive the multiple codewords sent by UE 204. Moreover, base station 202 (e.g., decoding component 214 of FIG. 2, ...) can attempt to decode the multiple codewords and can detect decoding statuses 302 for the multiple codewords. Status signaling component 216 can signal decoding statuses 302 for the multiple codewords to UE 204 employing various approaches as described herein. For instance, status signaling component 216 can leverage resource mapping component 218 and/or indicator selection component 220 to convey decoding statuses 302; yet, it is to be appreciated that the claimed subject matter is not so limited. Moreover, UE 204 can identify decoding statuses 302 sent by base station 202 by employing decoding component 222 and status detection component 224.

For example, if the multiple codeword uplink transmission sent by UE 204 includes two codewords, then two decoding statuses 302 respectively corresponding to the two codewords can be recognized by base station 202. The below discussion related to FIGS. 3-6 follows this example where the multiple codeword uplink transmission includes two codewords. However, it is to be appreciated that the claimed subject matter is not so limited as it is contemplated that the multiple codeword uplink transmission can include a differing number of codewords.

Further, decoding statuses 302 can be signaled by base station 202 to UE 204 over a downlink 304. For instance, decoding statuses can be conveyed in one or more subframes on downlink 304. By way of illustration, a subframe can include a control region and a data region. The control region, for instance, can typically include a first one, two, or three symbols (e.g., OFDM symbols, ...) of the subframe extending over a system bandwidth. Further, the data region can include a remainder of the symbols of the subframe extending over the system bandwidth.

Three types of downlink control channels can be transmitted by base station 202 upon resource elements from the control region of the subframe. The types of downlink control channels include Physical Control Format Indicator Channel (PCFICH), PHICH, and PDCCH. For example, PCFICH, PHICH, and PDCCH can be orthogonal; thus, resource elements respectively reserved for PCFICH, PHICH, and PDCCH can be non-overlapping.

A PCFICH can carry a control format indicator (CFI) that signals the number of symbols (e.g., typically one, two, or three, ...) included in the control region (e.g., used for transmission of control channel information in the subframe, ...). Resource elements carrying the PCFICH can span the system bandwidth in the first symbol of the subframe. For instance, sixteen resource elements can carry the PCFICH, and the sixteen resource elements can correspond to four resource element groups (REGs). The resource elements upon which the PCFICH can be mapped can be a function of a cell identifier (ID) corresponding to base station 202.

A PHICH can be utilized to carry a HARQ ACK/NAK indicator. For instance, the HARQ ACK/NAK indicator can signify whether base station 202 correctly received a PUSCH transmission as described in greater detail herein. Resource elements from one, two, or three symbols from the control region of the subframe can carry the PHICH (e.g., the PHICH can be limited to the control region, . . . ). Further, the resource elements carrying the PHICH can span the system bandwidth. For example, twelve resource elements (e.g., from one, two, or three symbols, . . . ) can carry the PHICH when employing normal cyclic prefix (CP), and the twelve resource elements can correspond to three REGs; however, the claimed subject matter is not limited to the foregoing example (e.g., it is contemplated that extended CP can be leveraged, . . . ).

A PDCCH can be employed to carry a downlink control information (DCI) message. For instance, several PDCCHs can be transmitted in a subframe. One, two, or three symbols in the control region of the subframe can be used for the one or more PDCCHs (e.g., as signaled by the PCFICH, . . . ). A PDCCH can be constructed as one or more CCEs, where a CCE can correspond to nine sets of four resource elements; thus, a CCE can include 36 resource elements. For example, it is contemplated that a PDCCH can be constructed as 1, 2, 4, or 8 CCEs; yet, the claimed subject matter is not so limited. A set of four resource elements can be referred to as a REG. The four resource elements of a REG can be within a resource block in a symbol. Further, a resource block can include two or three REGs depending upon whether or not the resource block in the symbol carries reference signals.

Figure 3:
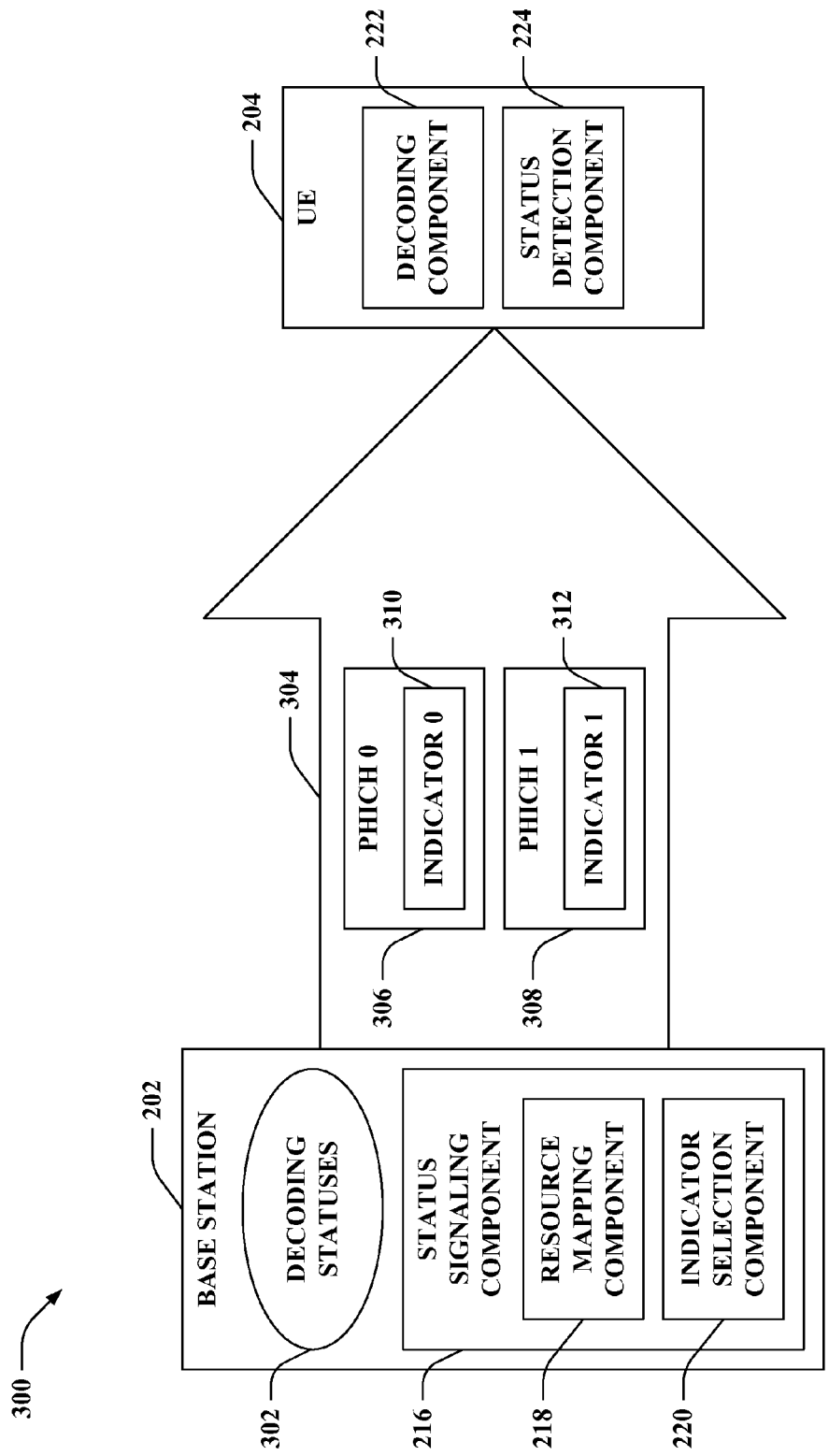
FIG. 3 is an illustration of an example system that signals decoding statuses for a plurality of codewords sent by a UE employing uplink MIMO via multiple PHICHs in a wireless communication environment.

Referring to FIG. 3, illustrated is a system 300 that signals decoding statuses 302 for a plurality of codewords sent by UE 204 employing uplink MIMO via multiple PHICHs in a wireless communication environment. Status signaling component 216 can employ disparate PHICHs to convey decoding statuses 302. For example, a respective decoding status for each of the plurality of codewords can be conveyed via an independent PHICH; however, it is to be appreciated that the claimed subject matter is not so limited.

For example, base station 202 can identify decoding statuses 302 for two codewords (e.g., codeword 0 and codeword 1, . . . ) sent by UE 204 as part of a multiple codeword uplink transmission. Further, status signaling component 216 can employ two PHICHs to convey decoding statuses 302 over downlink 304. For instance, status signaling component 216 can signal a decoding status corresponding to codeword 0 via PHICH 0 306 and a decoding status corresponding to codeword 1 via PHICH 1 308.

Following the above example, indicator selection component 220 can set an indicator 0 310 carried by PHICH 0 306 based upon the decoding status corresponding to codeword 0 and can set an indicator 1 312 carried by PHICH 1 308 based upon the decoding status corresponding to codeword 1. Indicator 0 310 can be an ACK or a NAK, which can signify whether codeword 0 is successfully decoded or unsuccessfully decoded by base station 202. Similarly, indicator 1 312 can be an ACK or a NAK, which can signify whether codeword 1 is successfully decoded or unsuccessfully decoded by base station 202.

Moreover, resource mapping component 218 can choose resource elements to carry PHICH 0 306 and PHICH 1 308, respectively. The resource elements used to carry a particular PHICH can be selected by resource mapping component 218 as a function of a PUSCH physical start resource block (RB) and a demodulation reference signal (DMRS) used by a corresponding codeword. Pursuant to the above example, resource mapping component 218 can choose resource elements to carry PHICH 0 306 based on a PUSCH physical start RB and a DMRS used by codeword 0. Moreover, resource mapping component 218 can choose resource elements to carry PHICH 1 308 based on a PUSCH physical start RB and a DMRS used by codeword 1.

Further, decoding component 222 can decode PHICH 0 306 and PHICH 1 308 to identify indicator 0 310 and indicator 1 312 respectively carried thereby. Moreover, status detection component 224 can derive decoding statuses for codeword 0 and codeword 1 based upon indicator 0 310 and indicator 1 312, respectively (e.g., status detection component 224 can detect that base station 202 successfully decoded codeword 0 if indicator 0 310 is an ACK or unsuccessfully decoded codeword 0 if indicator 0 310 is a NAK, status detection component 224 can detect that base station 202 successfully decoded codeword 1 if indicator 1 312 is an ACK or unsuccessfully decoded codeword 1 if indicator 1 312 is a NAK, . . . ). It is to be appreciated, however, that the claimed subject matter is not limited to the foregoing example.

System 300 can support providing each codeword sent by UE 204 as part of a multiple codeword uplink transmission with a corresponding, independent PHICH that can carry an ACK or NAK indicator. Further, resource elements chosen for an independent PHICH for a given codeword can be assigned by resource mapping component 218 as a function of a PUSCH physical start RB and a DMRS used for the given codeword. According to an example, if a codeword sent by UE 204 spans more than one layer, then the PHICH can be mapped to a DMRS on one of the layers by resource mapping component 218. By way of another example, utilization of multiple PHICHs as described in connection with system 300 can be implemented when UE 204 (e.g., layer mapping component 210 of FIG. 2, . . . ) uses layer shifting or forgoes use of layer shifting.

Figure 4:
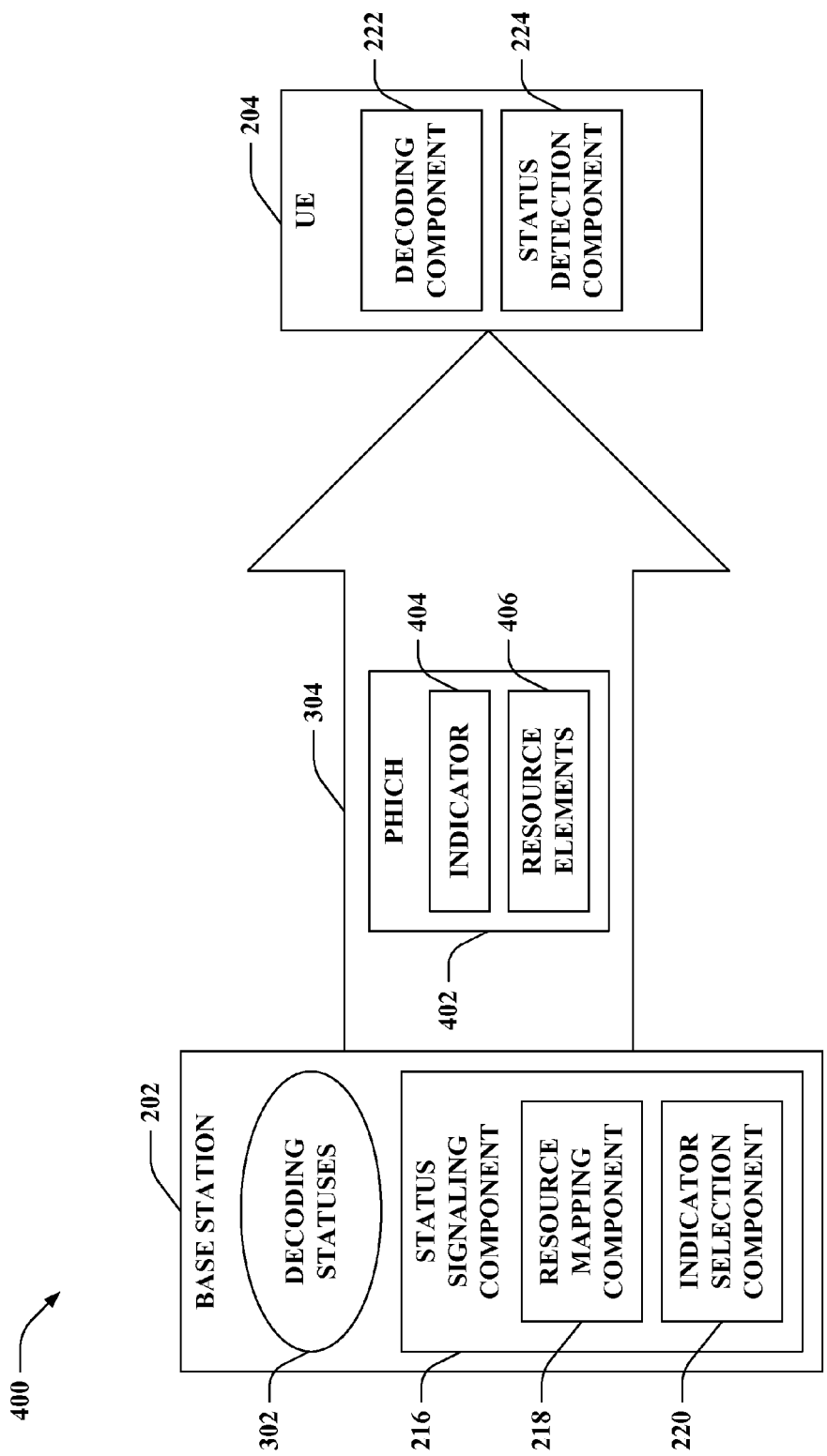
FIG. 4 is an illustration of an example system that signals decoding statuses for a plurality of codewords sent by a UE employing uplink MIMO via a single PHICH in a wireless communication environment.

Now turning to FIG. 4, illustrated is a system 400 that signals decoding statuses 302 for a plurality of codewords sent by UE 204 employing uplink MIMO via a single PHICH in a wireless communication environment. Status signaling component 216 can utilize the single PHICH to convey decoding statuses 302. Decoding statuses 302 can be signaled by status signaling component 216 for a plurality of codewords in a common transmission (e.g., a PHICH 402, . . . ) sent to UE 204 over downlink 304. More particularly, an indicator 404 carried by PHICH 402 and resource elements 406 on which PHICH 402 is mapped can convey decoding statuses 302 for the plurality of codewords in the common transmission.

For example, base station 202 can indicate decoding statuses 302 for two codewords (e.g., codeword 0 and codeword 1, . . . ) sent by UE 204 as part of a multiple codeword uplink transmission. Further, status signaling component 216 can employ PHICH 402 to convey decoding statuses 302 for the two codewords over downlink 304 in a common transmission. Moreover, resource mapping component 218 can select resource elements 406 on which PHICH 402 is sent by base station 202 over downlink 304 and indicator selection component 220 can control indicator 404 carried by PHICH 402 to signal decoding statuses 302 for the two codewords.

Resource mapping component 218 can map PHICH 402 to resource elements 406 as a function of a PUSCH physical start RB and a DMRS. For example, the DMRS utilized by resource mapping component 218 can be a DMRS used for one of the two codewords (e.g., DMRS used for codeword 0 or DMRS used for codeword 1, . . . ). By way of further example, if a codeword spans multiple layers, then the DMRS employed by resource mapping component 218 can be a DMRS used for one of the layers.

The combination of indicator 404 and resource elements 406 can convey decoding statuses 302 to UE 204. Thus, resource mapping component 218 can select resource elements 406 on which PHICH 402 is sent based on decoding results of the plurality of codewords (e.g., yielded by decoding component 214 of FIG. 2, . . . ). For instance, each of the plurality of codewords can have a unique resource mapping for a PHICH, where the resource mapping can be linked to an index of a DMRS used for that codeword (or indexes of DMRS for multiple codewords). Further, resource mapping component 218 can choose a particular resource mapping (e.g., corresponding to resource elements 406, . . . ) from a set of possible resource mappings associated with the plurality of codewords.

According to an example, UE 204 can send a multiple codeword uplink transmission that includes codeword 0 mapped to layer 0 and codeword 1 mapped to layer 1. Codeword 0 can be associated with a first DMRS (e.g., DMRS 0, . . . ) and codeword 1 can be associated with a second DMRS (e.g., DMRS 1, . . . ). An index of the first DMRS can be linked to a first resource mapping, and an index of the second DMRS can be linked to a second resource mapping. Depending upon decoding statuses 302 of codeword 0 and codeword 1, resource mapping component 218 can select either the first resource mapping or the second resource mapping to identify resource elements 406 used for PHICH 402. Moreover, based upon decoding statuses 302 of codeword 0 and codeword 1, indicator selection component 220 can control indicator 404 of PHICH 402.

Following the above example, one of four possible states can be utilized to convey decoding statuses 302 for codeword 0 and codeword 1 to UE 204 via indicator 404 and resource elements 406. The following provides an illustration of a potential link between decoding statuses 302 and the four possible states. For instance, indicator 404 can be set as an ACK by indicator selection component 220 and resource elements 406 corresponding to a first resource mapping associated with codeword 0 can be selected by resource mapping component 218 to signal successful decoding of both codeword 0 and codeword 1. Further, indicator 404 can be set as a NAK by indicator selection component 220 and resource elements 406 corresponding to a first resource mapping associated with codeword 0 can be selected by resource mapping component 218 to signal unsuccessful decoding of codeword 0 and successful decoding of codeword 1. Moreover, indicator 404 can be set as an ACK by indicator selection component 220 and resource elements 406 corresponding to a second resource mapping associated with codeword 1 can be selected by resource mapping component 218 to signal successful decoding of codeword 0 and unsuccessful decoding of codeword 1. Additionally, indicator 404 can be set as a NAK by indicator selection component 220 and resource elements 406 corresponding to a second resource mapping associated with codeword 1 can be selected by resource mapping component 218 to signal unsuccessful decoding of both codeword 0 and codeword 1. It is to be appreciated, however, that the claimed subject matter is not limited to the foregoing illustration.

Moreover, decoding component 222 of UE 204 can attempt to decode PHICH 402 in multiple locations based on multiple resource element assumptions. For instance, decoding component 222 can attempt to decode PHICH 402 at resource elements corresponding to the first resource mapping and the second resource mapping. Further, status detection component 224 can derive decoding statuses 302 for the plurality of codewords (or a subset thereof) based upon the decoding results of PHICH 402 using the multiple resource element assumptions.

According to an illustration, decoding component 222 can attempt to decode PHICH 402 at resource elements corresponding to the first resource mapping and at resource elements corresponding to the second resource mapping. Status detection component 224 can recognize if PHICH 402 is successfully decoded at the resource elements corresponding to the first resource mapping or at the resource elements corresponding to the second resource mapping. Moreover, status detection component 224 can identify whether indicator 404 carries an ACK or a NAK. Based the resource elements at which PHICH 402 is successfully decoded and whether indicator 404 specifies an ACK or a NAK, status detection component 224 can detect decoding statuses 302 for the plurality of codewords.

System 400 can support conveying a single PHICH (e.g., PHICH 402, . . . ) to signal decoding statuses 302 for the plurality of codewords sent by UE 204 as part of a multiple codeword uplink transmission. Status signaling component 216 can send PHICH 402 for the plurality of codewords, but decoding statuses 302 for the plurality of codewords can be conveyed through using different PHICH locations, where the PHICH locations can be linked to an index of a DMRS for each of the plurality of codewords (or the indexes of a DMRS for one, some or all of the plurality of codewords). By way of another example, utilization of the single PHICH (e.g., PHICH 402, . . . ) as described in connection with system 400 can be implemented when UE 204 (e.g., layer mapping component 210 of FIG. 2, . . . ) uses layer shifting or forgoes use of layer shifting.

Figure 5:
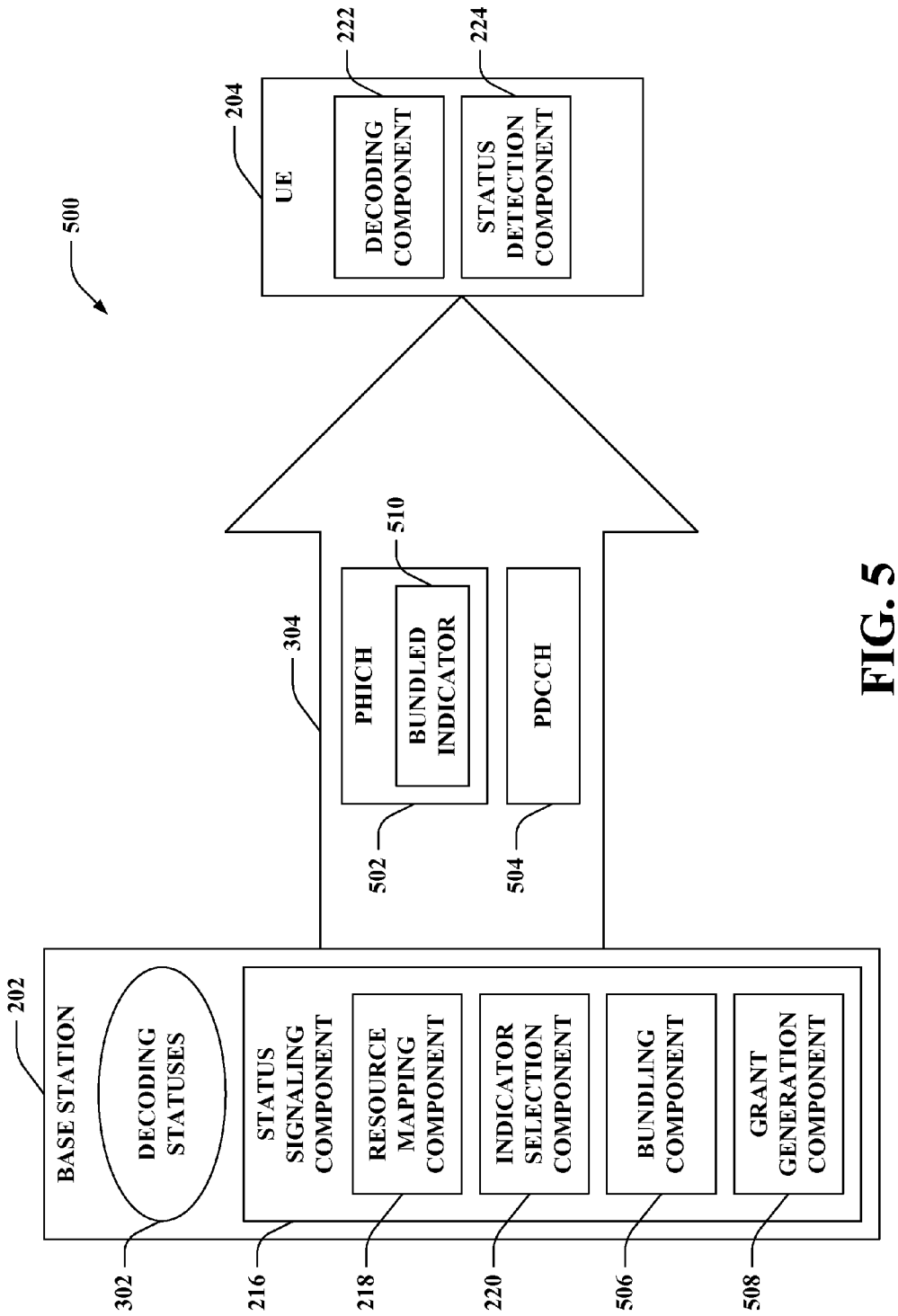
FIG. 5 is an illustration of an example system that signals decoding statuses for a plurality of codewords sent by a UE employing uplink MIMO via a single PHICH in a wireless communication environment.

With reference to FIG. 5, illustrated is a system 500 that signals decoding statuses 302 for a plurality of codewords sent by UE 204 employing uplink MIMO via a single PHICH in a wireless communication environment. Decoding statuses 302 can be signaled by status signaling component 216 for a plurality of codewords in a single PHICH (e.g., PHICH 502, . . . ) sent to UE 204 over downlink 304. Additionally or alternatively, decoding statuses 302 can be signaled by a PDCCH 504. Status signaling component 216 can include resource mapping component 218 and indicator selection component 220 as described herein. For example, resource mapping component 218 can employ a fixed location (e.g., fixed resource elements, . . . ) for carrying PHICH 502. Further, status signaling component 216 can include a bundling component 506 and a grant generation component 508.

Bundling component 506 can combine decoding statuses 302 for the plurality of codewords. Further, indicator selection component 220 can manage a bundled indicator 510 carried by PHICH 502 based upon the combined decoding statuses 302. By way of example, if both codeword 0 and codeword 1 are successfully decoded (e.g., both pass CRC, . . . ), then decoding statuses 302 for codeword 0 and codeword 1 can be joined (e.g., to indicate successful decoding, . . . ) by bundling component 506 and indicator selection component 220 can set bundled indicator 510 to specify an ACK. According to yet another example, if either codeword 0 or codeword 1 is unsuccessfully decoded, or if both codeword 0 and codeword 1 are unsuccessfully decoded (e.g., at least one codeword fails CRC, . . . ), then decoding statuses 302 for codeword 0 and codeword 1 can be joined (e.g., to indicate unsuccessful decoding, . . . ) by bundling component 506 and indicator selection component 220 can set bundled indicator 510 to signify a NAK.

Sending a single PHICH (e.g., PHICH 502, . . . ) with bundled indicator 510 over downlink 304 can lead to ambiguity since bundled indicator 510 can specify a NAK when one codeword is successfully decoded and another codeword is unsuccessfully decoded (or if both codewords are unsuccessfully decoded). Accordingly, in addition to or instead of transmitting bundled indicator 510 that specifies a NAK, grant generation component 508 can send PDCCH 504 over downlink 304 to UE 204, where PDCCH 504 can include information related to an uplink grant. For instance, grant generation component 508 can transmit PDCCH 504, which includes the information related to the uplink grant, to UE 204 for retransmission or new transmission if a maximum number of retransmissions has not been reached.

PDCCH 504 can have a larger payload compared to PHICH 502. For instance, a payload of PDCCH 504 can include 40-50 bits, while a payload of PHICH 502 can include 1-2 bits; however, it is to be appreciated that differing payload sizes are intended to fall within the scope of the hereto appended claims. Accordingly, PDCCH 504 can have capacity to convey information related to decoding statuses 302 to UE 204.

Various formats for PDCCH 504 yielded by grant generation component 508 are intended to fall within the scope of the hereto appended claims when base station 202 sends an uplink grant to UE 204. Pursuant to an example, grant generation component 508 can use special bit patterns in PDCCH 504 to indicate complete or partial decoding statuses 302 of each codeword. According to another example, grant generation component 508 can use different PDCCH formats and/or special bit patterns to indicate complete or partial decoding statuses 302 of each codeword. By way of yet another example, grant generation component 508 can use different PDCCH formats and/or special bit patterns and/or PHICH encoding to indicate complete or partial decoding statuses 302 of each codeword.

According to an example, grant generation component 508 can use a full PDCCH format or a compact PDCCH format. Following this example, the full PDCCH format can be utilized to carry information that identifies each codeword and the corresponding decoding status for the codeword. Thus, PDCCH 504 can include information that identifies codeword 0 and whether codeword 0 is successfully or unsuccessfully decoded, and information that identifies codeword 1 and whether codeword 1 is successfully or unsuccessfully decoded when the full PDCCH format is utilized by grant generation component 508. In contrast, the compact PDCCH format can be employed to carry information that identifies one codeword and the corresponding decoding status for that one codeword. Hence, PDCCH 504 can include information that identifies codeword 0 and whether codeword 0 is successfully or unsuccessfully decoded, or information that identifies codeword 1 and whether codeword 1 is successfully or unsuccessfully decoded when the compact PDCCH format is utilized by grant generation component 508. Further, the codeword not identified by the information included in PDCCH 504 when the compact PDCCH format is employed can be assumed to be successfully decoded; however, it is to be appreciated that any other assumption can be made for such codeword (e.g., assumed to be unsuccessfully decoded, assumed to have the same or a different decoding status as compared to the decoding status of the codeword identified by the information in PDCCH 504 when the compact PDCCH format is employed, . . . ).

By way of illustration, different PDCCH formats can be utilized by grant generation component 508 as follows. For instance, grant generation component 508 can initially employ a full PDCCH format that includes information for codeword 0 and codeword 1. If one of two codewords is successfully decoded, while the other of the two codewords is unsuccessfully decoded, then grant generation component 508 can shift to employing the compact PDCCH format. Accordingly, the compact PDCCH format can be employed to yield PDCCH 504 that includes information that identifies one of the codewords as well as indicates that the identified codeword was unsuccessfully decoded (e.g., PDCCH 504 with the compact PDCCH format can include information that identifies codeword 0 and specifies that codeword 0 was unsuccessfully decoded, PDCCH 504 with the compact PDCCH format can include information that identifies codeword 1 and specifies that codeword 1 was unsuccessfully decoded, . . . ).

By way of another example, PDCCH 504 yielded by grant generation component 508 need not include the information that specifies a decoding status for a given codeword. Rather, following this example, PDCCH 504 can include information that identifies a codeword, and the decoding status for the codeword can be signified by bundled indicator 510 carried by PHICH 502. In accordance with an illustration, bundled indicator 510 yielded by indicator selection component 220 can signify a NAK, while PDCCH 504 generated by grant generation component 508 can include information that identifies a codeword (e.g., codeword 0 or codeword 1, . . . ); thus, the codeword identified by the information provided by PDCCH 504 can be recognized by status detection component 224 as being unsuccessfully decoded. It is further contemplated, however, that PHICH 502 need not convey the decoding status for the codeword identified by the information provided by PDCCH 504. Rather, a decoding status (e.g., unsuccessful decoding, . . . ) can be assumed for the codeword identified by the information provided by PDCCH 504. Yet, it is to be appreciated that the claimed subject matter is not so limited.

Pursuant to a further example, grant generation component 508 can include information in PDCCH 504 that indicates to UE 204 to apply a transport block (TB) to codeword swap. For instance, transport block 0 can initially be mapped to codeword 0 and transport block 1 can initially be mapped to codeword 1. After receipt of PDCCH 504 including information that causes the transport block to codeword swap, transport block 0 can be mapped to codeword 1 and transport block 1 can be mapped to codeword 0 for a retransmission or a new transmission by UE 204. However, it is to be appreciated that the claimed subject matter is not limited to the foregoing.

Moreover, decoding component 222 of UE 204 can decode PHICH 502 and/or PDCCH 504. Further, status detection component 224 can derive decoding statuses 302 for the plurality of codewords (or a subset thereof) based upon the decoding results of PHICH 502 and/or PDCCH 504. According to an example, utilization of a single PHICH (e.g., PHICH 502, . . . ) in connection with system 500 can be implemented when UE 204 (e.g., layer mapping component 210 of FIG. 2, . . . ) uses layer shifting; however, it is to be appreciated that the claimed subject matter is not so limited.

Figure 6:
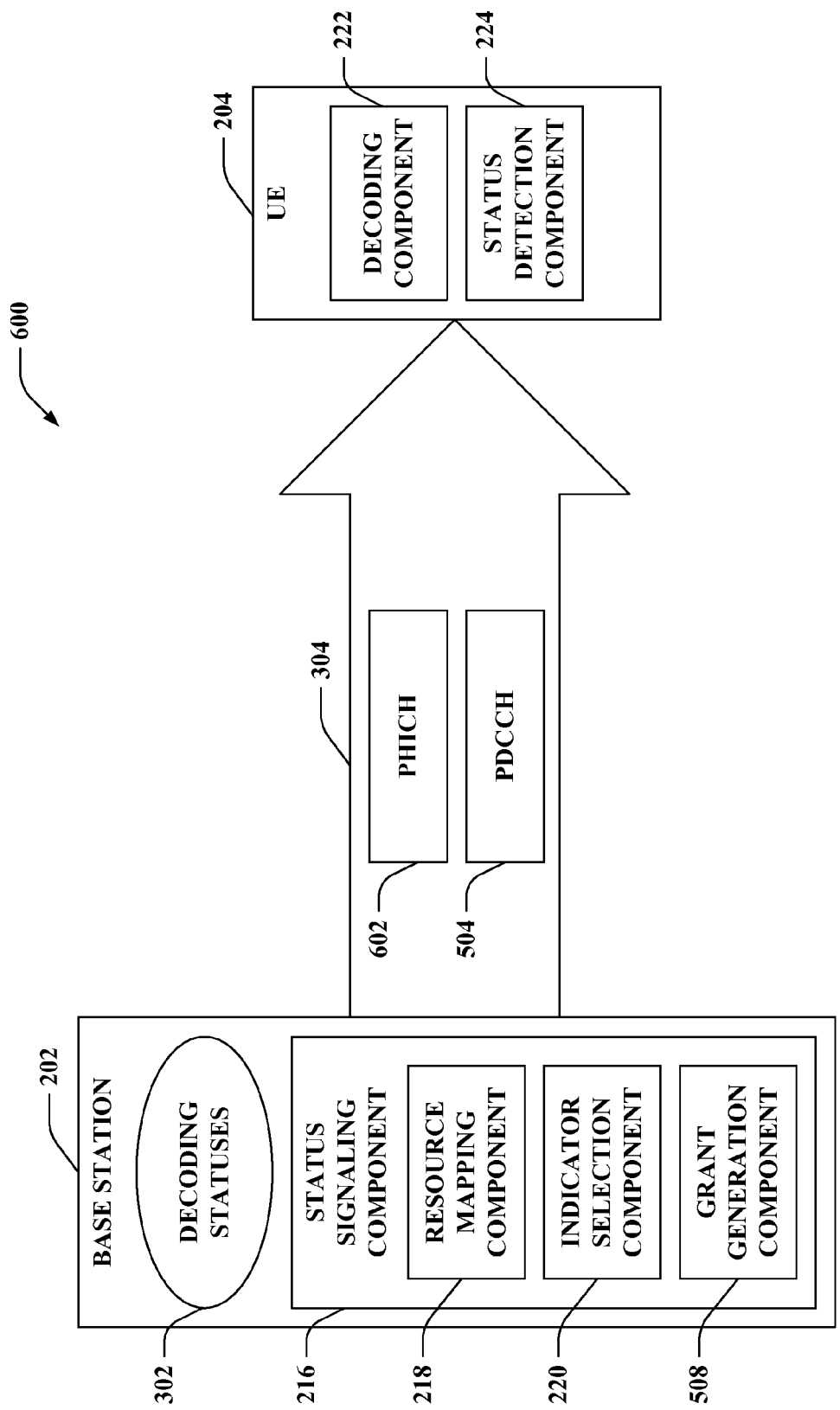
FIG. 6 is an illustration of an example system that signals decoding statuses for a plurality of codewords sent by a UE employing uplink MIMO via multiple PHICHs in a wireless communication environment.

Turning to FIG. 6, illustrated is a system 600 that signals decoding statuses 302 for a plurality of codewords sent by UE 204 employing uplink MIMO via multiple PHICHs in a wireless communication environment. Decoding statuses 302 can be signaled by status signaling component 216 for a plurality of codewords in multiple PHICHs. For instance, each of the multiple PHICHs can be associated with an intended codeword from the plurality of codewords. Thus, for instance, a PHICH 602 can be associated with codeword 0 or codeword 1. Status signaling component 216 can include resource mapping component 218, indicator selection component 220, and grant generation component 508.

According to an example, if a given codeword (e.g., from the plurality of codewords, . . . ) is unsuccessfully decoded, then retransmission or a new transmission can be effectuated. Hence, PHICH 602 yielded by status signaling component 216 and sent over downlink 304 can carry an indicator that signifies a NAK. Further, the NAK provided by PHICH 602 can apply to an intended codeword (e.g., the given codeword, . . . ). Additionally or alternatively, grant generation component 508 can send PDCCH 504 over downlink 304 to UE 204, where PDCCH 504 can include information related to an uplink grant. For instance, grant generation component 508 can transmit PDCCH 504, which includes the information related to the uplink grant, to UE 204 for retransmission or new transmission if a maximum number of retransmissions has not been reached.

Similar to the above description in connection with FIG. 5, various formats for PDCCH 504 yielded by grant generation component 508 are intended to fall within the scope of the hereto appended claims when base station 202 sends an uplink grant to UE 204. Pursuant to an example, grant generation component 508 can use special bit patterns in PDCCH 504 to indicate complete or partial decoding statuses 302 of each codeword. According to another example, grant generation component 508 can use different PDCCH formats and/or special bit patterns to indicate complete or partial decoding statuses 302 of each codeword. By way of yet another example, grant generation component 508 can use different PDCCH formats and/or special bit patterns and/or PHICH encoding to indicate complete or partial decoding statuses 302 of each codeword.

System 600 can support sending multiple PHICHs (e.g., PHICH 602, disparate PHICH(s) (not shown), . . . ) over downlink 304. Similar to the discussion related to FIG. 3, a respective decoding status for each of the plurality of codewords can be conveyed via an independent PHICH; however, it is to be appreciated that the claimed subject matter is not so limited. Additionally or alternatively, PDCCH 504 carrying information described herein can be sent over downlink 304. According to an example, utilization of multiple PHICHs (e.g., PHICH 602, . . . ) in connection with system 600 can be implemented when UE 204 (e.g., layer mapping component 210 of FIG. 2, . . . ) forgoes use of layer shifting; however, it is to be appreciated that the claimed subject matter is not so limited.

Figure 7:
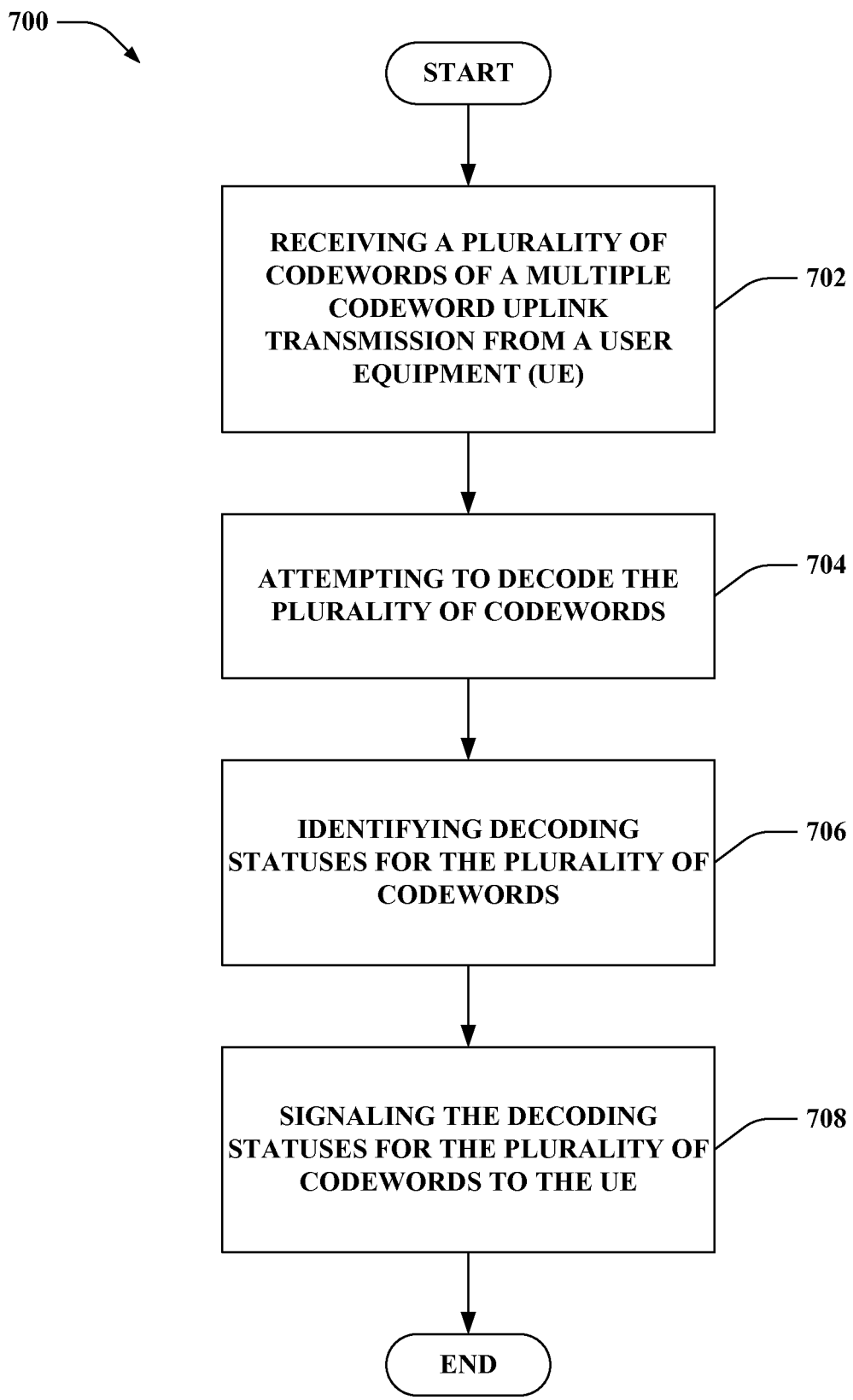
FIG. 7 is an illustration of an example methodology that facilitates conveying decoding statuses in a wireless communication environment.
Figure 8:
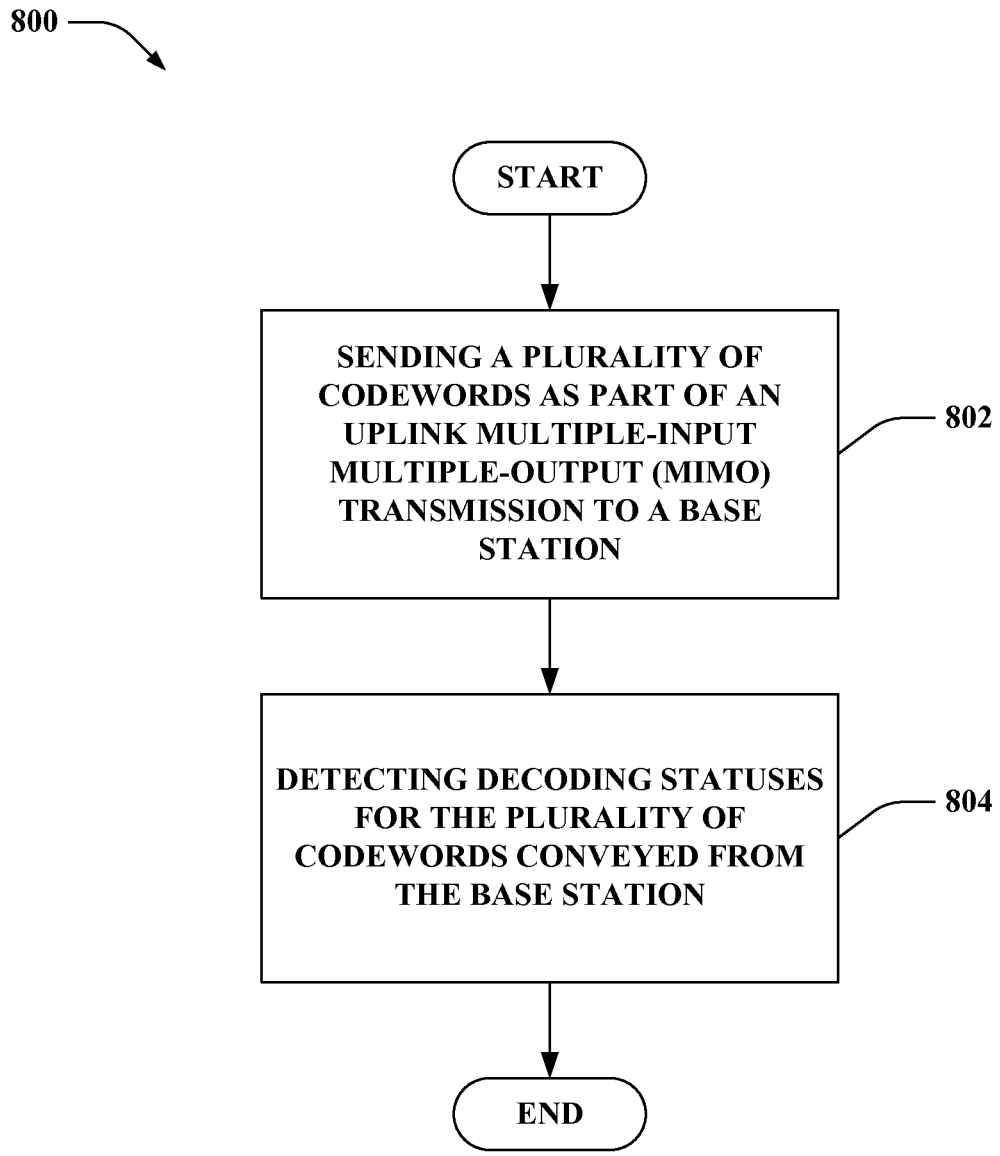
FIG. 8 is an illustration of an example methodology that facilitates obtaining decoding statuses in a wireless communication environment.

Referring to FIGS. 7-8, methodologies relating to conveying decoding statuses for a plurality of codewords sent as part of an uplink MIMO transmission in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that facilitates conveying decoding statuses in a wireless communication environment. At 702, a plurality of codewords of a multiple codeword uplink transmission can be received from a user equipment (UE). For instance, the plurality of codewords can be included in an uplink multiple-input multiple-output (MIMO) transmission received from the UE. According to an example, the multiple codeword uplink transmission can include two codewords; however, it is to be appreciated that the claimed subject matter is not so limited. At 704, an attempt to decode the plurality of codewords can be effectuated. At 706, decoding statuses for the plurality of codewords can be identified. For example, a first decoding status for a first codeword and a second decoding status for a second codeword can be identified. A decoding status for a codeword, for instance, can be that the codeword is successfully decoded or unsuccessfully decoded. Moreover, a decoding status for a codeword can be identified based upon whether the codeword passes or fails a cyclic redundancy check (CRC).

At 708, the decoding statuses for the plurality of codewords can be signaled to the UE. According to an example, the decoding statuses for the plurality of codewords can be signaled to the UE by sending multiple PHICHs. Following this example, a first decoding status for a first codeword from the plurality of codewords can be conveyed via a first PHICH from the multiple PHICHs, and a second decoding status for a second codeword from the plurality of codewords can be conveyed via a second PHICH from the multiple PHICHs.

By way of another example, the decoding statuses for the plurality of codewords can be signaled to the UE by sending a single PHICH. Pursuant to this example, resource elements on which the single PHICH is mapped can be selected based upon the decoding statuses for the plurality of codewords. Further, an indicator carried by the single PHICH and the resource elements on which the single PHICH is mapped can convey the decoding statuses for the plurality of codewords.

Pursuant to yet a further example, the decoding statuses for the plurality of codewords can be signaled to the UE at least in part by sending a PDCCH. For instance, the PDCCH can carry information that identifies a first decoding status corresponding to a first codeword and a second decoding status corresponding to a second codeword (e.g., when a full PDCCH format is employed, . . . ). According to another illustration, the PDCCH can carry information that specifies a particular codeword from the plurality of codewords. Following this illustration, a decoding status for the particular codeword specified by the information carried by the PDCCH can be conveyed by an indicator carried by a PHICH. Alternatively, a decoding status for the particular codeword specified by the information carried by the PDCCH can be predetermined (e.g., assumed to be unsuccessfully decoded, assumed to be successfully decoded, . . . ). Moreover, a decoding status for a codeword other than the particular codeword specified by the information carried by the PDCCH from the plurality of codewords can be predetermined (e.g., assumed to be successfully decoded, assumed to be unsuccessfully decoded, assumed to be the same or different as compared to the decoding status for the particular codeword conveyed by the indicator carried by the PHICH, . . . ). By way of another example, the PDCCH can carry information that indicates to the UE to apply a transport block to codeword swap.

Now turning to FIG. 8, illustrated is a methodology 800 that facilitates obtaining decoding statuses in a wireless communication environment. At 802, a plurality of codewords can be sent as part of an uplink multiple-input multiple-output (MIMO) transmission to a base station. At 804, decoding statuses for the plurality of codewords conveyed from the base station can be detected. Based upon the decoding statuses, retransmission or new transmission of one or more of the plurality of codewords can selectively be performed.

For example, the decoding statuses for the plurality of codewords can be detected from multiple PHICHs. Following this example, a decoding status for a first codeword from the plurality of codewords can be detected from a first PHICH from the multiple PHICHs, and a decoding status for a second codeword from the plurality of codewords can be detected from a second PHICH from the multiple PHICHs.

According to a further example, the decoding statuses for the plurality of codewords can be detected from a single PHICH. Pursuant to this example, the UE can attempt to decode the single PHICH at multiple resource element locations. Moreover, the decoding statuses can be derived as a function of decoding results at the multiple resource element locations and an indicator carried by the single PHICH.

In accordance with another example, the decoding statuses for the plurality of codewords can be detected at least in part from a PDCCH. For instance, the PDCCH can carry information that identifies a first decoding status corresponding to a first codeword and a second decoding status corresponding to a second codeword (e.g., when a full PDCCH format is employed, . . . ). According to another illustration, the PDCCH can carry information that specifies a particular codeword from the plurality of codewords. Following this illustration, a decoding status for the particular codeword specified by the information carried by the PDCCH can be recognized from an indicator carried by a PHICH. Alternatively, a decoding status for the particular codeword specified by the information carried by the PDCCH can be predetermined (e.g., assumed to be unsuccessfully decoded, assumed to be successfully decoded, . . . ). Moreover, a decoding status for a codeword other than the particular codeword specified by the information carried by the PDCCH from the plurality of codewords can be predetermined (e.g., assumed to be successfully decoded, assumed to be unsuccessfully decoded, assumed to be the same or different as compared to the decoding status for the particular codeword conveyed by the indicator carried by the PHICH, . . . ). By way of another example, the PDCCH can carry information that indicates to the UE to apply a transport block to codeword swap.

It will be appreciated that, in accordance with one or more aspects described herein, inferences can be made pertaining to conveying decoding statuses in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
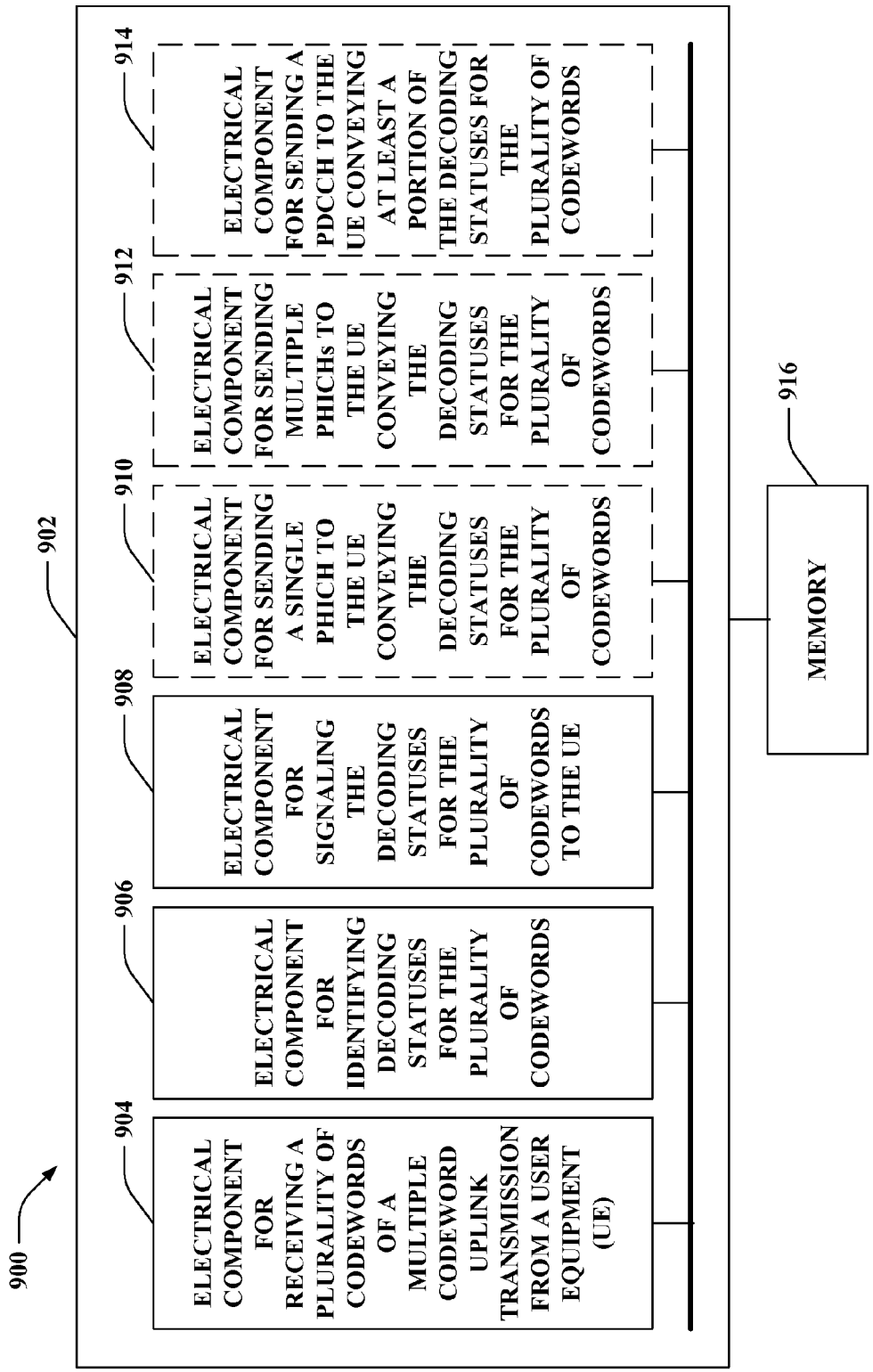
FIG. 9 is an illustration of an example system that enables conveying decoding statuses in a wireless communication environment.

With reference to FIG. 9, illustrated is a system 900 that enables conveying decoding statuses in a wireless communication environment. For example, system 900 can reside at least partially within a base station. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a plurality of codewords of a multiple codeword uplink transmission from a user equipment (UE) 904. Further, logical grouping 902 can include an electrical component for identifying decoding statuses for the plurality of codewords 906. Moreover, logical grouping 902 can include an electrical component for signaling the decoding statuses for the plurality of codewords to the UE 908. Logical grouping 902 can also optionally include an electrical component for sending a single PHICH to the UE conveying the decoding statuses for the plurality of codewords 910. Moreover, logical grouping 902 can optionally include an electrical component for sending multiple PHICHs to the UE conveying the decoding statuses for the plurality of codewords 912. Logically grouping 902 can also optionally include an electrical component for sending a PDCCH to the UE conveying at least a portion of the decoding statuses for the plurality of codewords 914. Additionally, system 900 can include a memory 916 that retains instructions for executing functions associated with electrical components 904, 906, 908, 910, 912, and 914. While shown as being external to memory 916, it is to be understood that one or more of electrical components 904, 906, 908, 910, 912, and 914 can exist within memory 916.

Figure 10:
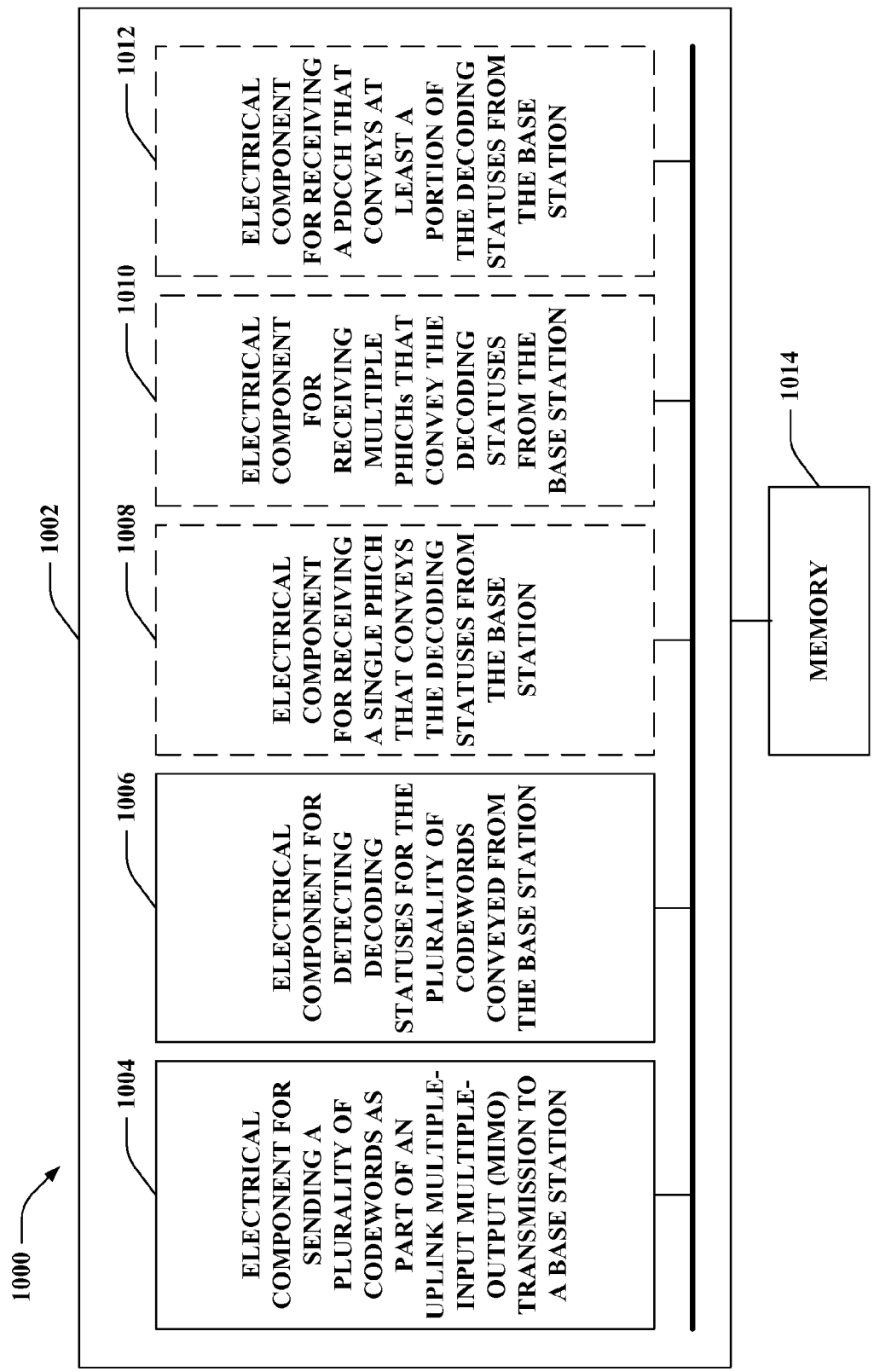
FIG. 10 is an illustration of an example system that enables obtaining decoding statuses in a wireless communication environment.

With reference to FIG. 10, illustrated is a system 1000 that enables obtaining decoding statuses in a wireless communication environment. For example, system 1000 can reside within a UE. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for sending a plurality of codewords as part of an uplink multiple-input multiple-output (MIMO) transmission to a base station 1004. Further, logical grouping 1002 can include an electrical component for detecting decoding statuses for the plurality of codewords conveyed from the base station 1006. Logical grouping 1002 can also optionally include an electrical component for receiving a single PHICH that conveys the decoding statuses from the base station 1008. Moreover, logical grouping 1002 can optionally include an electrical component for receiving multiple PHICHs that convey the decoding statuses from the base station 1010. Logical grouping 1002 can also optionally include an electrical component for receiving a PDCCH that conveys at least a portion of the decoding statuses from the base station 1012. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

Figure 11:
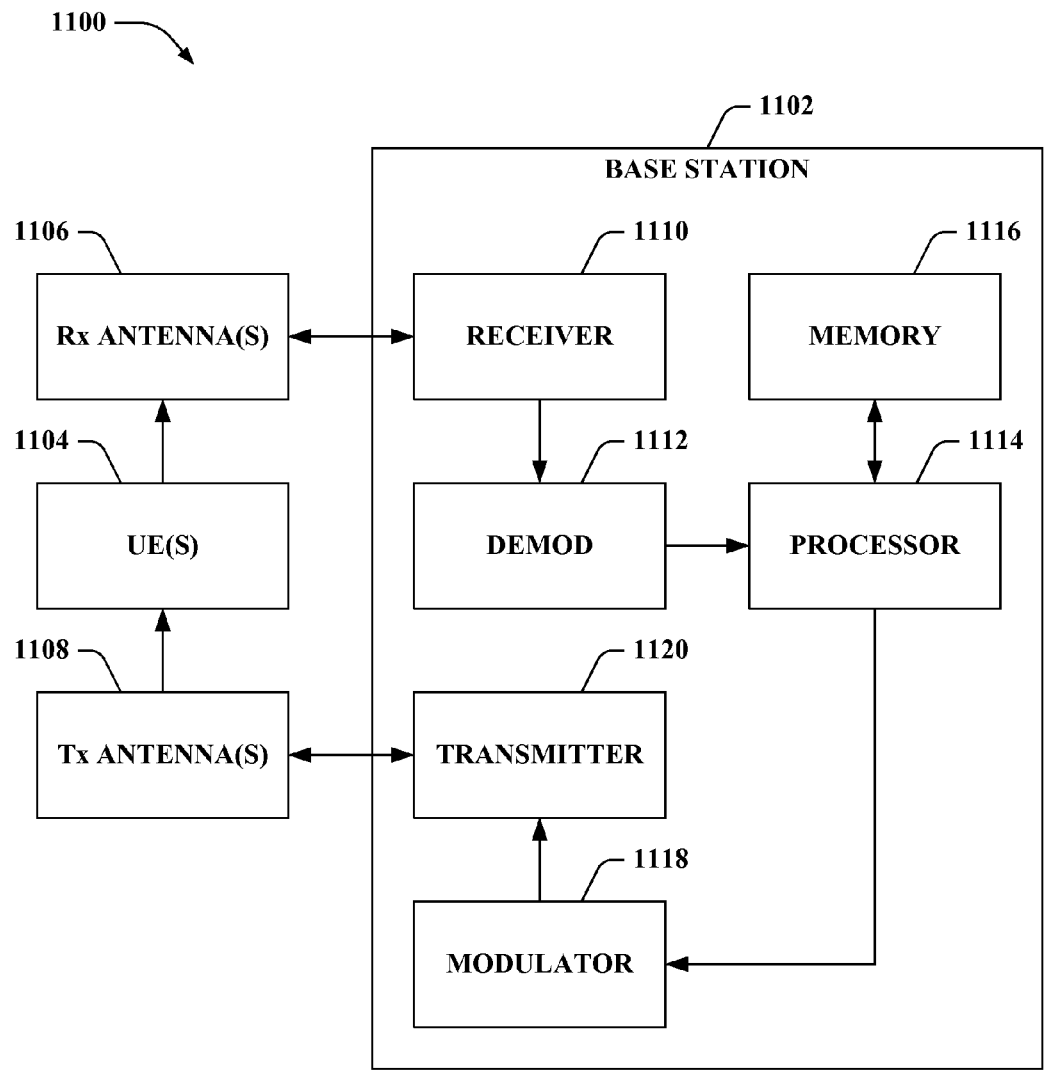
FIGS. 11-12 are illustrations of example systems that can be utilized to implement various aspects of the functionality described herein.

FIG. 11 is an illustration of a system 1100 that can be utilized to implement various aspects of the functionality described herein. System 1100 can include a base station 1102 (e.g., base station 202, . . . ). Base station 1102 can receive signal(s) from one or more UEs 1104 via one or more receive (Rx) antennas 1106 and transmit to the one or more UEs 1104 via one or more transmit (Tx) antennas 1108. Further, base station 1102 can include a receiver 1110 that receives information from receive antenna(s) 1106. According to an example, receiver 1110 can be operatively associated with a demodulator (demod) 1112 that demodulates received information. Demodulated symbols can be analyzed by a processor 1114. Processor 1114 can be coupled to memory 1116, which can store data to be transmitted to or received from UE(s) 1104 and/or any other suitable protocols, algorithms, information, etc. related to performing the various actions and functions set forth herein. For example, base station 1102 can employ processor 1114 to perform methodology 700 and/or other similar and appropriate methodologies. Base station 1102 can further include a modulator 1118 that can multiplex a signal for transmission by a transmitter 1120 through antenna(s) 1108.

Processor 1114 can be a processor dedicated to analyzing information received by receiver 1110, dedicated to generating information for transmission by transmitter 1120, or dedicated to controlling one or more components of base station 1102. According to another example, processor 1114 can analyze information received by receiver 1110, generate information for transmission by transmitter 1120, and control one or more components of base station 1102. The one or more components of base station 1102 can include, for example, decoding component 214, status signaling component 216, resource mapping component 218, indicator selection component 220, bundling component 506, and/or grant generation component 508. Moreover, although not shown, it is contemplated that the one or more components of base station 1102 can be part of processor 1114 or a plurality of processors (not shown).

Figure 12:
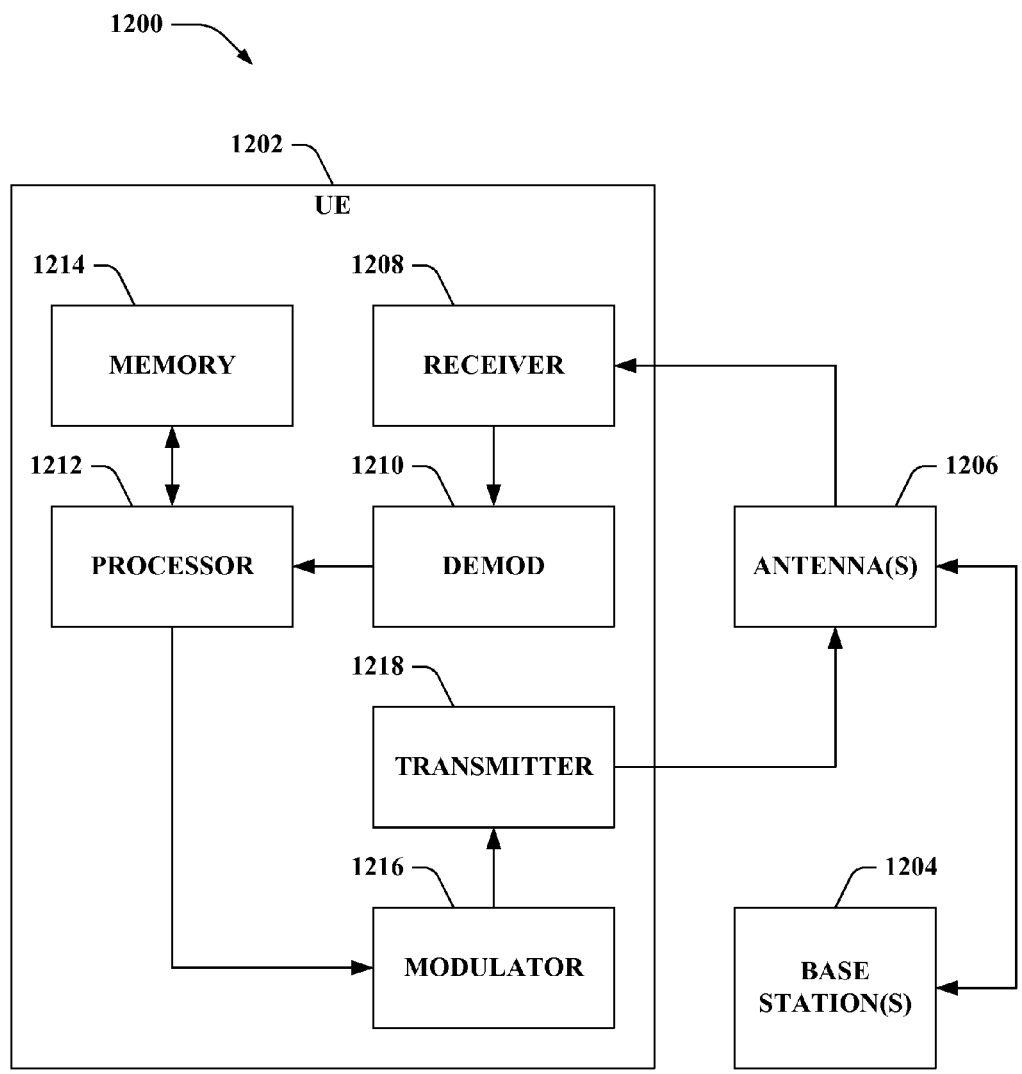

FIG. 12 is an illustration of a system 1200 that can be utilized to implement various aspects of the functionality described herein. System 1200 can include a UE 1202 (e.g., UE 204, ...). UE 1202 can receive signal(s) from one or more base stations 1204 and/or transmit to one or more base stations 1204 via one or more antennas 1206. Further, UE 1202 can include a receiver 1208 that receives information from antenna(s) 1206. According to an example, receiver 1208 can be operatively associated with a demodulator (demod) 1210 that demodulates received information. Demodulated symbols can be analyzed by a processor 1212. Processor 1212 can be coupled to memory 1214, which can store data to be transmitted to or received from base station(s) 1204 and/or any other suitable protocols, algorithms, information, etc. related to performing the various actions and functions set forth herein. For example, UE 1202 can employ processor 1212 to perform methodology 800 and/or other similar and appropriate methodologies. UE 1202 can further include a modulator 1216 that can multiplex a signal for transmission by a transmitter 1218 through antenna(s) 1206.

Processor 1212 can be a processor dedicated to analyzing information received by receiver 1208, dedicated to generating information for transmission by transmitter 1218, or dedicated to controlling one or more components of UE 1202. According to another example, processor 1212 can analyze information received by receiver 1208, generate information for transmission by transmitter 1218, and control one or more components of UE 1202. The one or more components of UE 1202 can include, for example, uplink MIMO transmission component 206, layer mapping component 210, decoding component 222, and/or status detection component 224. Moreover, although not shown, it is contemplated that the one or more components of UE 1202 can be part of processor 1212 or a plurality of processors (not shown).

Figure 13:
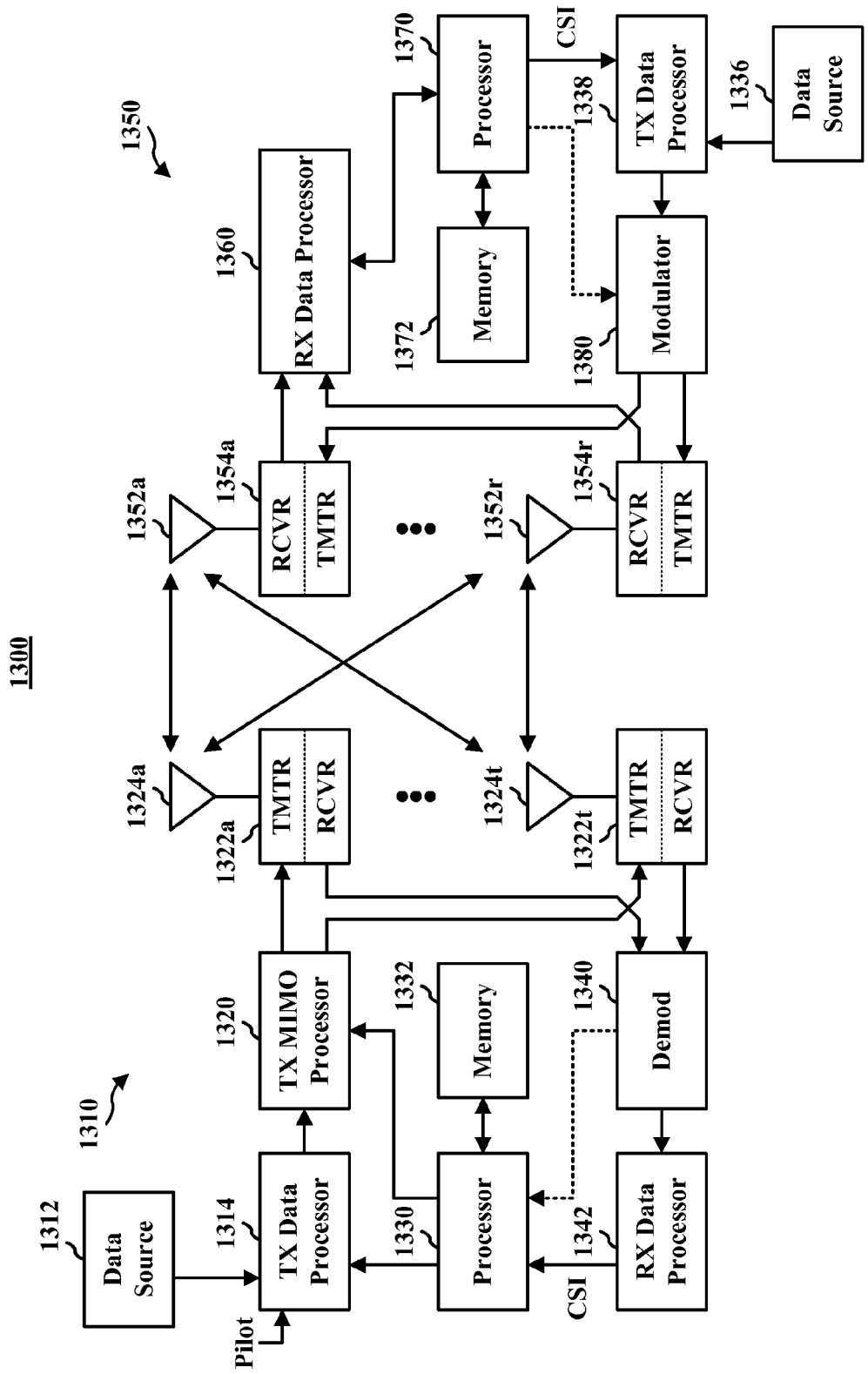
FIG. 13 is an illustration of an example wireless communication system that can be employed in conjunction with the various systems and methods described herein.

FIG. 13 shows an example wireless communication system 1300. Wireless communication system 1300 depicts one base station 1310 and one UE 1350 for sake of brevity. However, it is to be appreciated that system 1300 can include more than one base station and/or more than one UE, wherein additional base stations and/or UEs can be substantially similar or different from example base station 1310 and UE 1350 described below. In addition, it is to be appreciated that base station 1310 and/or UE 1350 can employ the systems (FIGS. 1-6 and 9-12) and/or methods (FIGS. 7-8) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At UE 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from UE 1350 are received by antennas 1324, conditioned by receivers 1322, demodulated by a demodulator 1340, and processed by a RX data processor 1342 to extract the reverse link message transmitted by UE 1350. Further, processor 1330 can process the extracted message to determine which precoding matrix to use for determining the beamforming weights.

Processors 1330 and 1370 can direct (e.g., control, coordinate, manage, etc.) operation at base station 1310 and UE 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communication, comprising:
   receiving, by a base station, a plurality of codewords of a multiple codeword uplink transmission from a user equipment (UE);
   determining decoding statuses for each of the plurality of codewords;
   selecting a resource element map from a plurality of resource element maps based at least in part on the decoding statuses for the plurality of codewords;
   mapping one or more channels to one or more resource elements defined by the selected resource element map; and
   sending, by a status signaling component of the base station, the decoding statuses for the plurality of codewords to the UE over the one or more channels, wherein the decoding statuses for the plurality of codewords are conveyed as a combination of both one or more decoding status indicators and a location of the one or more resource elements to which the one or more channels is mapped.

2. The method of claim 1, wherein the one or more channels comprises a first Physical Hybrid Automatic Repeat Request (HARQ) Indicator Channel (PHICH) and a second PHICH, and wherein the sending comprises:
   sending a first decoding status for a first codeword via the first PHICH; and
   sending a second decoding status for a second codeword via the second PHICH.

3. The method of claim 2, further comprising selecting resource elements on which at least one of the first PHICH or the second PHICH is mapped based upon a starting resource block and a demodulation reference signal associated with at least one of the first codeword or the second codeword.

4. The method of claim 1, wherein the one or more channels comprises a single Physical Hybrid Automatic Repeat Request (HARQ) Indicator Channel (PHICH), and wherein the sending comprises: sending the decoding statuses over the single PHICH.

5. The method of claim 4, further comprising: conveying the decoding statuses for the plurality of codewords using a decoding status indicator of the one or more decoding status indicators carried by the single PHICH and the one or more resource elements on which the single PHICH is mapped.

6. The method of claim 1, wherein the one or more channels comprises a Physical Downlink Control Channel (PDCCH), and wherein the sending comprises: sending the decoding statuses for the plurality of codewords at least in part by sending the PDCCH.

7. The method of claim 6, wherein the PDCCH carries information that identifies a first decoding status corresponding to a first codeword and a second decoding status corresponding to a second codeword.

8. The method of claim 6, wherein the PDCCH carries information that specifies a particular codeword from the plurality of codewords.

9. The method of claim 8, wherein a decoding status for the particular codeword is conveyed by a decoding status indicator of the one or more decoding status indicators carried by a Physical Hybrid Automatic Repeat Request (HARQ) Indicator Channel (PHICH).

10. The method of claim 8, wherein a decoding status for the particular codeword is predetermined.

11. The method of claim 6, wherein the PDCCH carries information that indicates to the UE to apply a transport block to codeword swap.

12. The method of claim 1, wherein the plurality of codewords are layer shifted codewords, the layer shifted codewords being mapped to a first layer at a first time and the layer shifted codewords being mapped to a second layer at a second time.

13. An apparatus for wireless communication, comprising:
a receiving module for receiving a plurality of codewords of a multiple codeword uplink transmission from a user equipment (UE);
a decoding module for determining decoding statuses for each of the plurality of codewords;
a resource mapping component for selecting a resource element map from a plurality of resource element maps based at least in part on the decoding statuses for the plurality of codewords, and mapping one or more channels to one or more resource elements defined by the selected resource element map; and
a transmitting module for sending the decoding statuses for the plurality of codewords to the UE over the one or more channels, wherein the decoding statuses for the plurality of codewords are conveyed as a combination of both one or more decoding status indicators and a location of the one or more resource elements to which the one or more channels is mapped.

14. The apparatus of claim 13, wherein the one or more channels comprises multiple Physical Hybrid Automatic Repeat Request (HARQ) Indicator Channels (PHICHs), and wherein the transmitting module is configured to send the decoding statuses for the plurality of codewords by sending the multiple PHICHs.

15. The apparatus of claim 13, wherein the one or more channels comprises a single Physical Hybrid Automatic Repeat Request (HARQ) Indicator Channel (PHICH), and wherein the transmitting module is configured to send the decoding statuses for the plurality of codewords by sending the single PHICH.

16. The apparatus of claim 15, wherein the transmitting module is configured to send the decoding statuses for the plurality of codewords using a decoding status indicator of the one or more decoding status indicators carried by the single PHICH and the one or more resource elements on which the single PHICH is mapped.

17. The apparatus of claim 13, wherein the one or more channels comprises a Physical Downlink Control Channel (PDCCH), and wherein the transmitting module is configured to send the decoding statuses for the plurality of codewords at least in part by sending the PDCCH.

18. The apparatus of claim 17, wherein the PDCCH carries information that identifies a first decoding status corresponding to a first codeword and a second decoding status corresponding to a second codeword.

19. The apparatus of claim 17, wherein the PDCCH carries information that specifies a particular codeword from the plurality of codewords.

20. The apparatus of claim 19, wherein a decoding status for the particular codeword is conveyed by a decoding status indicator of the one or more decoding status indicators carried by a Physical Hybrid Automatic Repeat Request (HARQ) Indicator Channel (PHICH).

21. An apparatus for wireless communication, comprising:
means for receiving a plurality of codewords of a multiple codeword uplink transmission from a user equipment (UE);
means for determining decoding statuses for each of the plurality of codewords;
means for selecting a resource element map from a plurality of resource element maps based at least in part on the decoding statuses for the plurality of codewords;
means for mapping one or more channels to one or more resource elements defined by the selected resource element map; and
means for sending the decoding statuses for the plurality of codewords to the UE over the one or more channels, wherein the decoding statuses for the plurality of codewords are conveyed as a combination of both one or more decoding status indicators and a location of the one or more resource elements to which the one or more channels is mapped.

22. The apparatus of claim 21, wherein the one or more channels comprises a single Physical Hybrid Automatic Repeat Request (HARQ) Indicator Channel (PHICH), and wherein the means for sending comprises: means for sending the single PHICH to the UE conveying the decoding statuses for the plurality of codewords.

23. The apparatus of claim 21, wherein the one or more channels comprises multiple Physical Hybrid Automatic Repeat Request (HARQ) Indicator Channels (PHICHs), and wherein the means for sending comprises: means for sending the multiple PHICHs to the UE conveying the decoding statuses for the plurality of codewords.

24. The apparatus of claim 21, wherein the one or more channels comprises a Physical Downlink Control Channel (PDCCH), and wherein the means for sending comprises: means for sending the PDCCH to the UE conveying at least a portion of the decoding statuses for the plurality of codewords.

25. A non-transitory computer-readable medium storing computer-executable code for wireless communications, the code executable by a processor to:
receive a plurality of codewords of a multiple codeword uplink transmission from a user equipment (UE);
determine decoding statuses for each of the plurality of codewords;
select a resource element map from a plurality of resource element maps based at least in part on the decoding statuses for the plurality of codewords;
map one or more channels to one or more resource elements defined by the selected resource element map; and
signal the decoding statuses for the plurality of codewords to the UE over the one or more channels, wherein the decoding statuses for the plurality of codewords are conveyed as a combination of both one or more decoding status indicators and a location of the one or more resource elements to which the one or more channels is mapped.

26. The non-transitory computer-readable medium of claim 25, wherein the one or more channels comprises a single Physical Hybrid Automatic Repeat Request (HARQ) Indicator Channel (PHICH), and wherein the code for signaling comprises: code for sending the single PHICH to the UE conveying the decoding statuses for the plurality of codewords.

27. The non-transitory computer-readable medium of claim 25, wherein the one or more channels comprises multiple Physical Hybrid Automatic Repeat Request (HARQ) Indicator Channels (PHICHs), and wherein the code for signaling comprises: code for sending the multiple PHICHs to the UE conveying the decoding statuses for the plurality of codewords.

28. The non-transitory computer-readable medium of claim 25, wherein the one or more channels comprises a Physical Downlink Control Channel (PDCCH), and wherein the code for signaling comprises: code for sending the PDCCH to the UE conveying at least a portion of the decoding statuses for the plurality of codewords.

29. A method for wireless communication, comprising:
sending, by an uplink multiple-input multiple-output (MIMO) transmission component of a user equipment (UE), a plurality of codewords as part of an uplink multiple-input multiple-output (MIMO) transmission to a base station; and
detecting decoding statuses, by a status detection component of the UE, for each of the plurality of codewords conveyed as a combination of both one or more decoding status indicators and a location of one or more resource elements to which one or more channels is mapped from the base station over the one or more channels, wherein the one or more channels are mapped to the one or more resource elements according to a resource element map, wherein the resource element map is selected from among a plurality of resource element maps based at least in part on the decoding statuses for the plurality of codewords.

30. The method of claim 29, wherein the one or more channels comprises multiple Physical Hybrid Automatic Repeat Request (HARQ) Indicator Channels (PHICHs), and wherein the detecting comprises: detecting the decoding statuses from the multiple PHICHs.

31. The method of claim 29, wherein the one or more channels comprises a single Physical Hybrid Automatic Repeat Request (HARQ) Indicator Channel (PHICH), and wherein the detecting comprises: detecting the decoding statuses from the single PHICH.

32. The method of claim 31, further comprising:
attempting to decode the single PHICH at multiple resource element locations; and
determining the decoding statuses as a function of decoding results at the multiple resource element locations and a decoding status indicator of the one or more decoding status indicators carried by the single PHICH.

33. The method of claim 29, wherein the one or more channels comprises a Physical Downlink Control Channel (PDCCH), and wherein the detecting comprises: detecting the decoding statuses at least in part from the PDCCH.

34. The method of claim 33, wherein the PDCCH carries information that identifies a first decoding status corresponding to a first codeword and a second decoding status corresponding to a second codeword.

35. The method of claim 33, wherein the PDCCH carries information that specifies a particular codeword from the plurality of codewords, and wherein a decoding status for the particular codeword is predetermined or conveyed by a decoding status indicator of the one or more decoding status indicators carried by a Physical Hybrid Automatic Repeat Request (HARQ) Indicator Channel (PHICH).

36. An apparatus for wireless communication, comprising:
a transmitting module for sending a plurality of codewords as part of an uplink multiple-input multiple-output (MIMO) transmission to a base station;
a receiving module for receiving decoding statuses for each of the plurality of codewords conveyed as a combination of both one or more decoding status indicators and a location of one or more resource elements to which one or more channels is mapped from the base station over the one or more channels, wherein the one or more channels are mapped to the one or more resource elements according to a resource element map, wherein the resource element map is selected from among a plurality of resource element maps based at least in part on the decoding statuses; and
a detecting module for detecting the decoding statuses for each of the plurality of codewords.

37. The apparatus of claim 36, wherein the one or more channels comprises multiple Physical Hybrid Automatic Repeat Request (HARQ) Indicator Channels (PHICHs), and wherein the detecting module is configured to detect the decoding statuses for the plurality of codewords from the multiple PHICHs.

38. The apparatus of claim 36, wherein the one or more channels comprises a single Physical Hybrid Automatic Repeat Request (HARQ) Indicator Channel (PHICH), and wherein the detecting module is configured to detect the decoding statuses for the plurality of codewords from the single PHICH.

39. The apparatus of claim 38, further comprising a decoding module for attempting to decode the single PHICH at multiple resource element locations, and wherein the detecting module is configured to derive the decoding statuses for the plurality of codewords as a function of decoding results at the multiple resource element locations and a decoding status indicator of the one or more decoding status indicators carried by the single PHICH.

40. The apparatus of claim 36, wherein the one or more channels comprises a Physical Downlink Control Channel (PDCCH), and wherein the detecting module is configured to detect the decoding statuses for the plurality of codewords at least in part from the PDCCH.

41. An apparatus for wireless communication, comprising:
means for sending a plurality of codewords as part of an uplink multiple-input multiple-output (MIMO) transmission to a base station; and
means for detecting decoding statuses for each of the plurality of codewords conveyed as a combination of both one or more decoding status indicators and a location of one or more resource elements to which one or more channels is mapped from the base station over the one or more channels, wherein the one or more channels are mapped to the one or more resource elements according to a resource element map, wherein the resource element map is selected from among a plurality of resource element maps based at least in part on the decoding statuses for the plurality of codewords.

42. The apparatus of claim 41, wherein the one or more channels comprises a single Physical Hybrid Automatic Repeat Request (HARQ) Indicator Channel (PHICH), further comprising: means for receiving the single PHICH that conveys the decoding statuses from the base station.

43. The apparatus of claim 41, wherein the one or more channels comprises multiple Physical Hybrid Automatic Repeat Request (HARQ) Indicator Channels (PHICHs), further comprising: means for receiving the multiple PHICHs that convey the decoding statuses from the base station.

44. The apparatus of claim 41, wherein the one or more channels comprises a Physical Downlink Control Channel (PDCCH), further comprising: means for receiving the PDCCH that conveys at least a portion of the decoding statuses from the base station.

45. A non-transitory computer-readable medium storing computer-executable code for wireless communications, the code executable by a processor to:
send a plurality of codewords as part of an uplink multiple-input multiple-output (MIMO) transmission to a base station; and detect decoding statuses for each of the plurality of codewords conveyed as a combination of both one or more decoding status indicators and a location of one or more resource elements to which one or more channels is mapped from the base station over the one or more channels, wherein the one or more channels are mapped to the one or more resource elements according to a resource element map, wherein the resource element map is selected from among a plurality of resource element maps based at least in part on the decoding statuses for the plurality of codewords.

46. The non-transitory computer-readable medium of claim 45, wherein the one or more channels comprises a single Physical Hybrid Automatic Repeat Request (HARQ) Indicator Channel (PHICH), and wherein the computer-readable medium further comprises: code for receiving the single PHICH that conveys the decoding statuses from the base station.

47. The non-transitory computer-readable medium of claim 45, wherein the one or more channels comprises multiple Physical Hybrid Automatic Repeat Request (HARQ) Indicator Channels (PHICHs), and wherein the computer-readable medium further comprises: code for receiving the multiple PHICHs that convey the decoding statuses from the base station.

48. The non-transitory computer-readable medium of claim 45, wherein the one or more channels comprises a Physical Downlink Control Channel (PDCCH), and wherein the computer-readable medium further comprises: code for receiving the PDCCH that conveys at least a portion of the decoding statuses from the base station.

\* \* \* \* \*